US010788995B2

(12) United States Patent
Nguyen

(10) Patent No.: US 10,788,995 B2
(45) Date of Patent: Sep. 29, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Van Vinh Nguyen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 16/052,902

(22) Filed: Aug. 2, 2018

(65) Prior Publication Data
US 2019/0050158 A1    Feb. 14, 2019

(30) Foreign Application Priority Data
Aug. 14, 2017    (JP) .................................. 2017-156475

(51) Int. Cl.
*G06F 3/06*    (2006.01)
*G06F 11/20*    (2006.01)

(52) U.S. Cl.
CPC .......... *G06F 3/0629* (2013.01); *G06F 3/0604* (2013.01); *G06F 3/0653* (2013.01);
(Continued)

(58) Field of Classification Search
CPC ............... G06F 1/00–3296; G06F 3/00; G06F 3/06–0689; G06F 5/00–16;
(Continued)

(56) References Cited

U.S. PATENT DOCUMENTS 5,459,857 A * 10/1995 Ludlam .............. G06F 11/2071
714/6.12
6,223,252 B1 * 4/2001 Bandera .............. G06F 11/2069
711/112
(Continued)

FOREIGN PATENT DOCUMENTS

JP    2011-76130    4/2011

OTHER PUBLICATIONS

N. S. Islam, M. Wasi-ur-Rahman, X. Lu and D. K. D. K. Panda, "Efficient data access strategies for Hadoop and Spark on HPC cluster with heterogeneous storage," 2016 IEEE International Conference on Big Data (Big Data), Washington, DC, 2016, pp. 223-232 (Year: 2016).*

(Continued)

*Primary Examiner* — Daniel C. Chappell
(74) *Attorney, Agent, or Firm* — Fujitsu Patent Center

(57) ABSTRACT

An information processing apparatus configured to control a first storage apparatus and a second storage apparatus, the first and second storage apparatuses include a first plurality of groups of a plurality of volumes and a second plurality of groups of a plurality of volumes respectively, a plurality of pairs of the first plurality of groups and the second plurality of groups is formed, correspondence relationship information between the first plurality of groups and the second plurality of groups, and function information that represents an active system or a standby system, identify first performance of the plurality of volumes, identify second performance of the first plurality of groups and the second plurality of groups based on the first performance, and based on the second performance, the correspondence relationship information, and the function information, select a specific pair in which switching is executed between the active system and the standby system.

12 Claims, 16 Drawing Sheets

(52) U.S. Cl.
CPC .......... *G06F 3/0673* (2013.01); *G06F 3/0683* (2013.01); *G06F 11/2069* (2013.01); *G06F 11/2071* (2013.01); *G06F 3/065* (2013.01); *G06F 3/0619* (2013.01)

(58) Field of Classification Search
CPC ..... G06F 11/00–3696; G06F 12/00–16; G06F 13/00–4295; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 8,712,984 | B2* | 4/2014 | Zhang | G06F 3/061 707/705 |
| 9,965,394 | B2* | 5/2018 | Romanovskiy | G06F 3/0661 |
| 2005/0015657 | A1* | 1/2005 | Sugiura | G06F 11/1482 714/6.12 |
| 2006/0248308 | A1* | 11/2006 | Wang | G06F 11/2089 711/173 |
| 2011/0078396 | A1* | 3/2011 | Hiraiwa | G06F 11/2058 711/162 |
| 2012/0254654 | A1* | 10/2012 | Blinick | G06F 11/2028 714/4.11 |
| 2013/0067274 | A1* | 3/2013 | Huang | G06F 13/12 714/6.22 |
| 2014/0188795 | A1* | 7/2014 | Alewine | G06F 11/1662 707/615 |
| 2015/0120968 | A1* | 4/2015 | Ono | G06F 3/067 710/74 |
| 2017/0099203 | A1* | 4/2017 | Shapur | H04L 67/1097 |
| 2018/0074922 | A1* | 3/2018 | Akirav | G06F 11/2007 |

OTHER PUBLICATIONS

D. A. Ford, R. J. T. Morris and A. E. Bell, "Redundant arrays of independent libraries (RAIL): a tertiary storage system," COMPCON '96. Technologies for the Information Superhighway Digest of Papers, Santa Clara, CA, USA, 1996, pp. 280-285 (Year: 1996).*

B. Wei, L. Xiao, W. Wei, Y. Song and B. Zhou, "A New Adaptive Coding Selection Method for Distributed Storage Systems," in IEEE Access, vol. 6, pp. 13350-13357, 2018 (Year: 2018).*

* cited by examiner

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-156475, filed on Aug. 14, 2017, the entire contents of which are incorporated herein by reference.

FIELD

The embodiments discussed herein are related to an information processing apparatus, a method and a non-transitory computer-readable storage medium.

BACKGROUND

A storage apparatus is used for storing of data. The storage apparatus may be equipped with plural storing devices such as hard disk drive (HDD) and solid state drive (SSD) and offers a high-capacity storage area.

For example, there is a proposal to improve the availability of a system by a technique that uses plural storage apparatuses and is called storage clustering. In this proposal, synchronous remote copy processing is executed from a first storage apparatus to a second storage apparatus and thereby data of the first storage apparatus is made redundant. If the function breakdown of the first storage apparatus occurs, a host computer continues operation by the second storage apparatus. Furthermore, when asynchronous remote copy processing from the first storage apparatus to a third storage apparatus becomes non-executable due to function breakdown of the first storage apparatus, the host computer initiates asynchronous remote copy processing from the second storage apparatus to the third storage apparatus. As a related-art document, Japanese Laid-open Patent Publication No. 2011-76130 exists.

SUMMARY

According to an aspect of the embodiments, an information processing apparatus configured to control a first storage apparatus and a second storage apparatus, the first storage apparatus and the second storage apparatus including a plurality of volumes respectively, the first storage apparatus including a first plurality of groups generated by grouping the plurality of volumes and the second storage apparatus including a second plurality of groups generated by grouping the plurality of volumes, a plurality of pairs each of which includes a respective one of the first plurality of groups and a respective one of the second plurality of groups being formed, the information processing apparatus includes a memory, and a processor coupled to the memory and configured to obtain correspondence relationship information that represents a correspondence relationship between the respective one of the first plurality of groups and the respective one of the second plurality of groups in each of the plurality of pairs, and function information that represents whether the respective one of the first plurality of groups and the respective one of the second plurality of groups function as an active system or function as a standby system in each of the plurality of pairs, identify first performance of each of the plurality of volumes of the first storage apparatus and the plurality of volumes of the second storage apparatus, identify second performance of each of the first plurality of groups and each of the second plurality of groups based on the first performance, and based on the second performance, the correspondence relationship information, and the function information, select, from the plurality of pairs pair, a specific pair in which switching is executed between the active system and the standby system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

It is conceivable that volumes offered by storage apparatuses are grouped and pairs are made between groups that belong to one storage apparatus and groups that belong to the other storage apparatus and a redundant configuration of active system/standby system is made on each pair basis. A certain group that belongs to the one storage apparatus is used as the active system that processes access from an upper-level apparatus and another group that belongs to the other storage apparatus is used as the standby system corresponding to this group of the active system.

If this is employed, a first group of an active system is disposed in the one storage apparatus and a second group of an active system is disposed in the other storage apparatus, so that it becomes possible to process data access in both storage apparatuses. Furthermore, failover in units of pair not in units of storage apparatuses becomes possible. However, the status of access to each group of the active system possibly changes according to the contents of stored data, the time zone, and so forth. This causes a problem that there is a possibility that the load associated with the data access is biased toward one storage apparatus depending on the arrangement of the groups of the active system.

Figure 1:
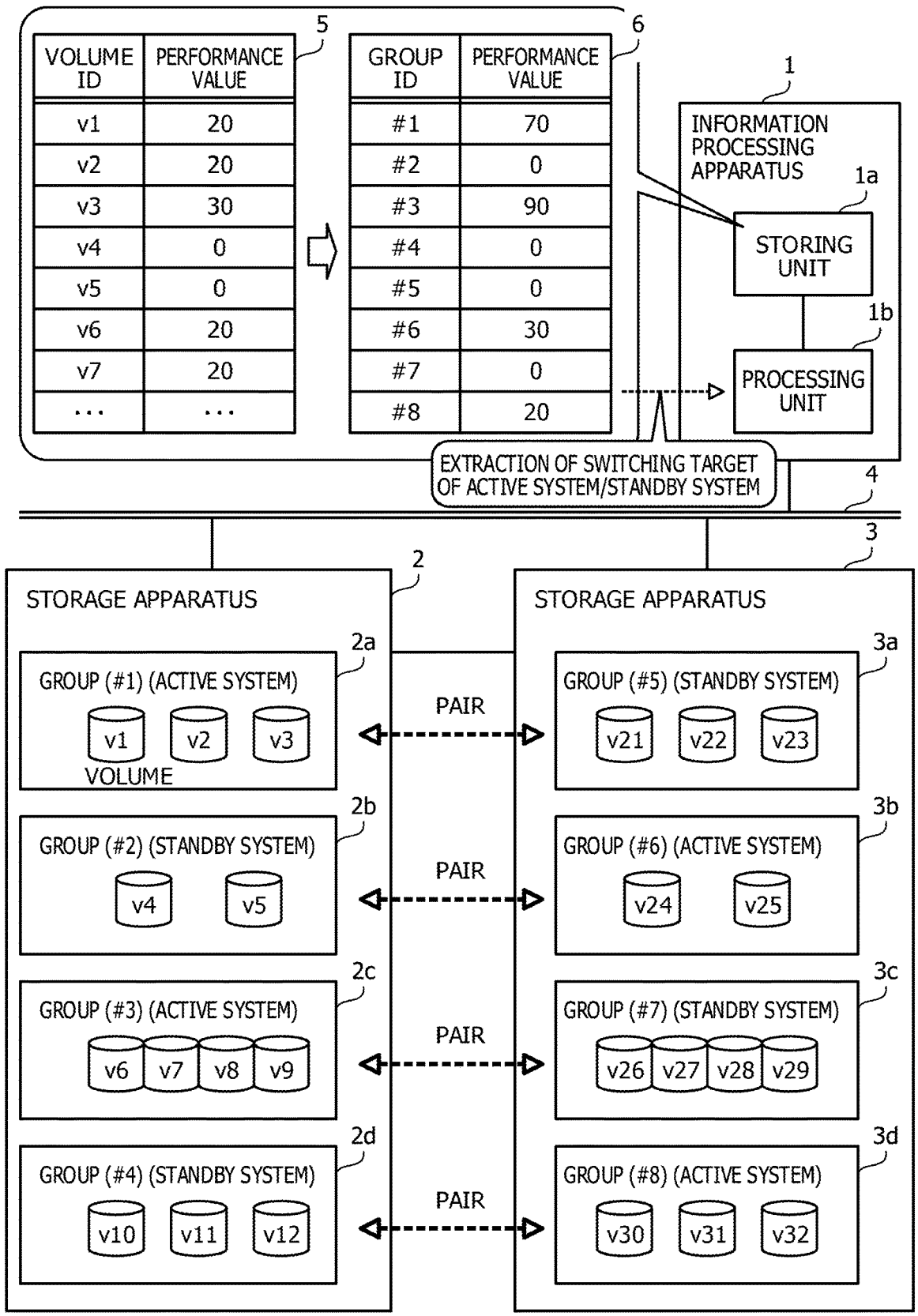
FIG. 1 is a diagram illustrating an information processing apparatus of a first embodiment.

FIG. 1 is a diagram illustrating an information processing apparatus of a first embodiment. An information processing apparatus 1 is coupled to storage apparatuses 2 and 3 through a network 4. The storage apparatuses 2 and 3 store data used for processing of an upper-level apparatus. The upper-level apparatus may be the information processing apparatus 1 or may be another information processing apparatus (diagrammatic representation is omitted). The storage apparatuses 2 and 3 include plural storing devices such as HDD and SSD and offer a high-capacity storage area.

The storage area of the storage apparatuses 2 and 3 is managed in a unit called a volume. One volume may correspond to one HDD or SSD. Alternatively, one volume may correspond to one logical storage area in an HDD or SSD (for example, storage area at part of an HDD, logical storage area created by combining plural HDDs). For example, the storage apparatuses 2 and 3 offer a logical storage area by using plural HDDs or SSDs based on a technique of Redundant Arrays of Inexpensive Disks (RAID) in some cases.

The storage apparatus 2 includes plural volumes. The plural volumes in the storage apparatus 2 are grouped. A set of grouped volumes will be referred to as a group. The storage apparatus 2 includes plural groups. The storage apparatus 3 also includes plural volumes similarly. Furthermore, the storage apparatus 3 also includes plural groups.

Pairs are made between the groups that belong to the storage apparatus 2 and the groups that belong to the storage apparatus 3. Plural pairs are made between the storage apparatuses 2 and 3. Regarding each pair, the group used as an active system and the group used as a standby system are defined. In a certain pair, the group that belongs to the storage apparatus 2 is used as an active system and the group that belongs to the storage apparatus 3 is used as a standby system in some cases. Furthermore, in another pair, the group that belongs to the storage apparatus 2 is used as a standby system and the group that belongs to the storage apparatus 3 is used as an active system in some cases.

Data access by the upper-level apparatus is carried out to the group of the active system. For this reason, the load associated with the data access is applied mainly to the group of the active system in the groups that belong to the pair. The storage apparatus to which the group of the active system belongs carries out also reflection of updated data into the group of the standby system (remote copy). The remote copy may be carried out in synchronization with data update of the active system in response to an update request from the upper-level apparatus or may be carried out asynchronously with the data update of the active system. The storage apparatuses 2 and 3 are mutually coupled by a path for remote copy.

The information processing apparatus 1 offers a function of balancing the load associated with data access of the storage apparatuses 2 and 3 based on the arrangement of the groups of the active system. The information processing apparatus 1 includes a storing unit 1a and a processing unit 1b.

The storing unit 1a may be a volatile storing apparatus such as a random access memory (RAM) or may be a non-volatile storing apparatus such as a HDD or flash memory. The processing unit 1b may include central processing unit (CPU), digital signal processor (DSP), application specific integrated circuit (ASIC), field programmable gate array (FPGA), and so forth. The processing unit 1b may be a processor that executes a program. In the term "processor" used here, a collection of plural processors (multiprocessor) may also be included.

The storing unit 1a stores information that represents pairs of first groups of volumes that belong to a first storage apparatus and second groups of volumes that belong to a second storage apparatus.

For example, the storage apparatus 2 (first storage apparatus) includes groups 2a, 2b, 2c, and 2d. The group 2a includes volumes v1, v2, and v3. Identification information of the group 2a is "#1." Here, for example, the volume identified based on identification information "v1" is represented as "volume v1" (the other volumes are also represented similarly). The group 2b includes volumes v4 and v5. The identification information of the group 2b is "#2." The group 2c includes volumes v6, v7, v8, and v9. The identification information of the group 2c is "#3." The group 2d includes volumes v10, v11, and v12. The identification information of the group 2d is "#4."

Furthermore, the storage apparatus 3 (second storage apparatus) includes groups 3a, 3b, 3c, and 3d. The group 3a includes volumes v21, v22, and v23. The identification information of the group 3a is "#5." The group 3b includes volumes v24 and v25. The identification information of the group 3b is "#6." The group 3c includes volumes v26, v27, v28, and v29. The identification information of the group 3c is "#7." The group 3d includes volumes v30, v31, and v32. The identification information of the group 3d is "#8."

For example, the storage apparatuses 2 and 3 include four pairs of groups. The first pair is a pair of the groups 2a and 3a. The second pair is a pair of the groups 2b and 3b. The third pair is a pair of the groups 2c and 3c. The fourth pair is a pair of the groups 2d and 3d. In one example, the storing unit 1a stores information that represents these pairs.

The storing unit 1a stores information that represents the group of an active system and the group of a standby system in the pair regarding each pair.

For example, in the pair of the groups 2a and 3a, the group 2a is an active system and the group 3a is a standby system. In the pair of the groups 2b and 3b, the group 2b is a standby system and the group 3b is an active system. In the pair of the groups 2c and 3c, the group 2c is an active system and the group 3c is a standby system. In the pair of the groups 2d and 3d, the group 2d is a standby system and the group 3d is an active system. In one example, the storing unit 1a stores information that represents the arrangement status of these volumes of active system/standby system (which group is an active system and which group is a standby system) regarding each pair.

Furthermore, the storing unit 1a stores a collection result 5 of performance information of each volume collected by the processing unit 1b. The storing unit 1a stores an analysis result 6 of the performance information of each group based on the collection result 5.

The processing unit 1b collects the performance information of each volume of the first and second storage apparatuses. For example, the processing unit 1b collects the performance information of each of the volumes v1 to v12 of the storage apparatus 2. The processing unit 1b collects the performance information of each of the volumes v21 to v32 of the storage apparatus 3. The performance information is the throughput (amount of data processed per unit time) in each volume, for example. The throughput may be the average, in a given period (t), of either one of the amount (x) of data read out from the relevant volume in response to a request for access to data from an upper-level apparatus and the amount (y) of data written to the relevant volume in the given time t or the total of the amount (x) and the amount (y). For example, the throughput may be an amount represented by any of x/t, y/t, and (x+y)/t (for example, unit is bytes/second). Alternatively, the performance information may be the answering time (response time) with respect to a request for access to data, for example. It may also be said that the performance information is an index of the load of the storage apparatuses 2 and 3 (for example, when the throughput or response time is larger, the load will also be larger).

The processing unit 1b stores the collected performance information in the storing unit 1a. The collection result 5 is the result of collection of the performance information of each volume by the processing unit 1b. In the example of the collection result 5, the performance information of each volume is referred to as "performance value." For example, in the collection result 5, the performance information of a performance value "20" is registered for the volume v1. Furthermore, in the collection result 5, an example is represented in which the performance information is observed as a performance value "0" (or value that is so small as to be ignorable) regarding the groups used as the standby system because these groups do not accept a direct access request from an upper-level apparatus. In this case, the processing unit 1b collects the performance information relating to the groups of the active system and does not have to collect the performance information relating to the groups of the standby system.

The processing unit 1b analyzes the performance information of each group by using the sum of the collected pieces of performance information regarding each volume. For example, in the case of using the throughput as the performance information of each volume, the processing unit 1b employs the sum of the throughputs of the volumes that belong to the group to which attention is paid as the throughput (performance information) of this group. In the case of using the response time as the performance information of each volume, the processing unit 1b may employ the average obtained by dividing the sum of the response times of the volumes that belong to the group to which attention is paid by the number of volumes that belong to this group as the response time (performance information) of this group. The processing unit 1b stores the analysis result 6 of the performance information of each group in the storing unit 1a. In the example of the analysis result 6, the performance information of each volume is referred to as "performance value." In the example of the analysis result 6, the performance value of a certain group is the sum of the performance values of the respective volumes that belong to this group. For example, the performance value of the group 2a is 20+20+30=70.

The processing unit 1b extracts the pair of the switching target of the active system and the standby system among the plural pairs based on the analysis result. For example, the processing unit 1b extracts the pair of the switching target of the active system and the standby system among the four pairs in the storage apparatuses 2 and 3 based on the analysis result 6 stored in the storing unit 1a. The processing unit 1b instructs the storage apparatuses 2 and 3 to switch the active system and the standby system regarding the extracted pair. The storage apparatuses 2 and 3 switch the roles of the active system and the standby system about the groups that belong to the pair regarding which the instruction has been made. Thereupon, the load of the group of the active system is transferred from the storage apparatus of the switching source of the active system to the storage apparatus of the switching destination of the active system. Thus, for example, the load of the storage apparatus of the switching source of the active system is alleviated by transferring the role of part of the active system from the storage apparatus with the higher load to the storage apparatus with the lower load. In addition, the difference in the load between both apparatuses may be adjusted by transferring, from the storage apparatus with the lower load to the storage apparatus with the higher load, a group with a performance value lower than the performance value of the group transferred from the storage apparatus with the higher load to the storage apparatus with the lower load.

For example, it is conceivable that the processing unit 1b extracts the pair of the switching target by the following method.

In a first example, the processing unit 1b extracts, as the pairs of the switching target, the pair to which the group of the active system with the maximum performance value on the side of the storage apparatus with the larger total sum of the performance values belongs and the pair to which the group of the active system with the minimum performance value on the side of the storage apparatus with the smaller total sum of the performance values belongs.

In the example of the analysis result 6, the total sum of the performance values of the storage apparatus 2 is 70+90=160. The total sum of the performance values of the storage apparatus 3 is 30+20=50. Therefore, the processing unit 1b extracts, as the pairs of the switching target, the pair to which the group 2c with the maximum performance value on the side of the storage apparatus 2 with the larger total sum of the performance values belongs and the pair to which the group 3d with the minimum performance value on the side of the storage apparatus 3 with the smaller total sum of the performance values belongs.

The processing unit 1b instructs the storage apparatuses 2 and 3 to switch the active system and the standby system in both extracted pairs. The storage apparatuses 2 and 3 switch the group 2c to the standby system and switch the group 3c to the active system in response to the instruction. Furthermore, the storage apparatuses 2 and 3 switch the group 3d to the standby system and switch the group 2d to the active system in response to the instruction. As a result, the performance value observed regarding the storage apparatus 2 is expected to become 70+20=90. Furthermore, the performance value observed regarding the storage apparatus 3 is expected to become 30+90=120. The difference between these performance values 120−90=30 is smaller than the difference between the switching 160−50=110. Thus, the load of the storage apparatuses 2 and 3 may be properly balanced.

In a second example, the processing unit 1b extracts, as the pairs of the switching target, the pair to which the group of the active system with the maximum performance value on the side of the storage apparatus with the larger total sum of the performance values belongs and the pair to which the group of the active system with the maximum performance value on the side of the storage apparatus with the smaller total sum of the performance values belongs. In the example of the analysis result 6, the processing unit 1*b* extracts, as the pairs of the switching target, the pair to which the group 2*c* with the maximum performance value on the side of the storage apparatus 2 with the larger total sum of the performance values belongs and the pair to which the group 3*b* with the maximum performance value on the side of the storage apparatus 3 with the smaller total sum of the performance values belongs.

The processing unit 1*b* instructs the storage apparatuses 2 and 3 to switch the active system and the standby system in both extracted pairs. The storage apparatuses 2 and 3 switch the group 2*c* to the standby system and switch the group 3*c* to the active system in response to the instruction. Furthermore, the storage apparatuses 2 and 3 switch the group 3*b* to the standby system and switch the group 2*b* to the active system in response to the instruction. As a result, the performance value observed regarding the storage apparatus 2 is expected to become 70+30=100. Furthermore, the performance value observed regarding the storage apparatus 3 is expected to become 90+20=110. The difference between these performance values 110−100=10 is smaller than the difference between the switching 160−50=110. Thus, also in this case, the load of the storage apparatuses 2 and 3 may be properly balanced.

The processing unit 1*b* may select the extraction method with which the difference in the performance value of the storage apparatuses 2 and 3 (performance value expected regarding a respective one of the storage apparatuses 2 and 3) after the switching becomes the smallest among the plural extraction methods represented in the above-described first example and second example.

Here, it is conceivable that the redundant configuration of active system/standby system is made on each pair basis as in the storage apparatuses 2 and 3. If this is employed, it becomes possible to process data access in both of the storage apparatuses 2 and 3. Furthermore, failover in units of pair not in units of storage apparatuses becomes possible. However, the status of access to data stored in each group possibly changes according to the contents of the stored data, the time zone, and so forth. This causes a problem that there is a possibility that the load associated with the data access is biased toward one storage apparatus depending on the arrangement of the groups of the active system.

Therefore, the information processing apparatus 1 collects the performance information of each group from the storage apparatuses 2 and 3 and extracts the pair of the switching target of the active system and the standby system based on the collected pieces of performance information. This makes it possible to properly balance the load of the storage apparatuses 2 and 3 even when a bias is generated in the load of the storage apparatuses 2 and 3 due to change in the access status. As a result, the difference in the load between the storage apparatuses 2 and 3 may be reduced and leveling of the load in the storage apparatuses 2 and 3 may be intended.

The processing unit 1*b* may carry out the above-described extraction of the pair of the switching target when detecting that the load of the storage apparatuses 2 and 3 is in an imbalanced state. For example, the processing unit 1*b* may detect that the load of the storage apparatuses 2 and 3 is in an imbalanced state if both or either one of the performance value of the storage apparatus 2 and the performance value of the storage apparatus 3 surpasses a reference value and the difference between both performance values surpasses a threshold. Here, the performance value of the storage apparatus 2 is the total sum of the performance values of the groups that belong to the storage apparatus 2 or the total sum of the performance values of the volumes that belong to the storage apparatus 2. This applies also to the storage apparatus 3. If this is employed, the processing unit 1*b* may correct the bias of the load in the storage apparatuses 2 and 3 when the bias of the load is comparatively large. For example, unnecessary switching may be suppressed by avoiding switching of active system/standby system in the case of a bias of the load at such a level that no trouble is caused in the operation.

For example, the storage apparatus 2 may have functions of the information processing apparatus 1. For example, a storage control apparatus that controls data access in the storage apparatus 2 may have functions of the information processing apparatus 1. For example, the storage control apparatus may include a storing unit equivalent to the storing unit 1*a* and a processing unit equivalent to the processing unit 1*b*.

In the following, functions of the information processing apparatus 1 will be described in more detail with exemplification of a more concrete system.

Second Embodiment

Figure 2:
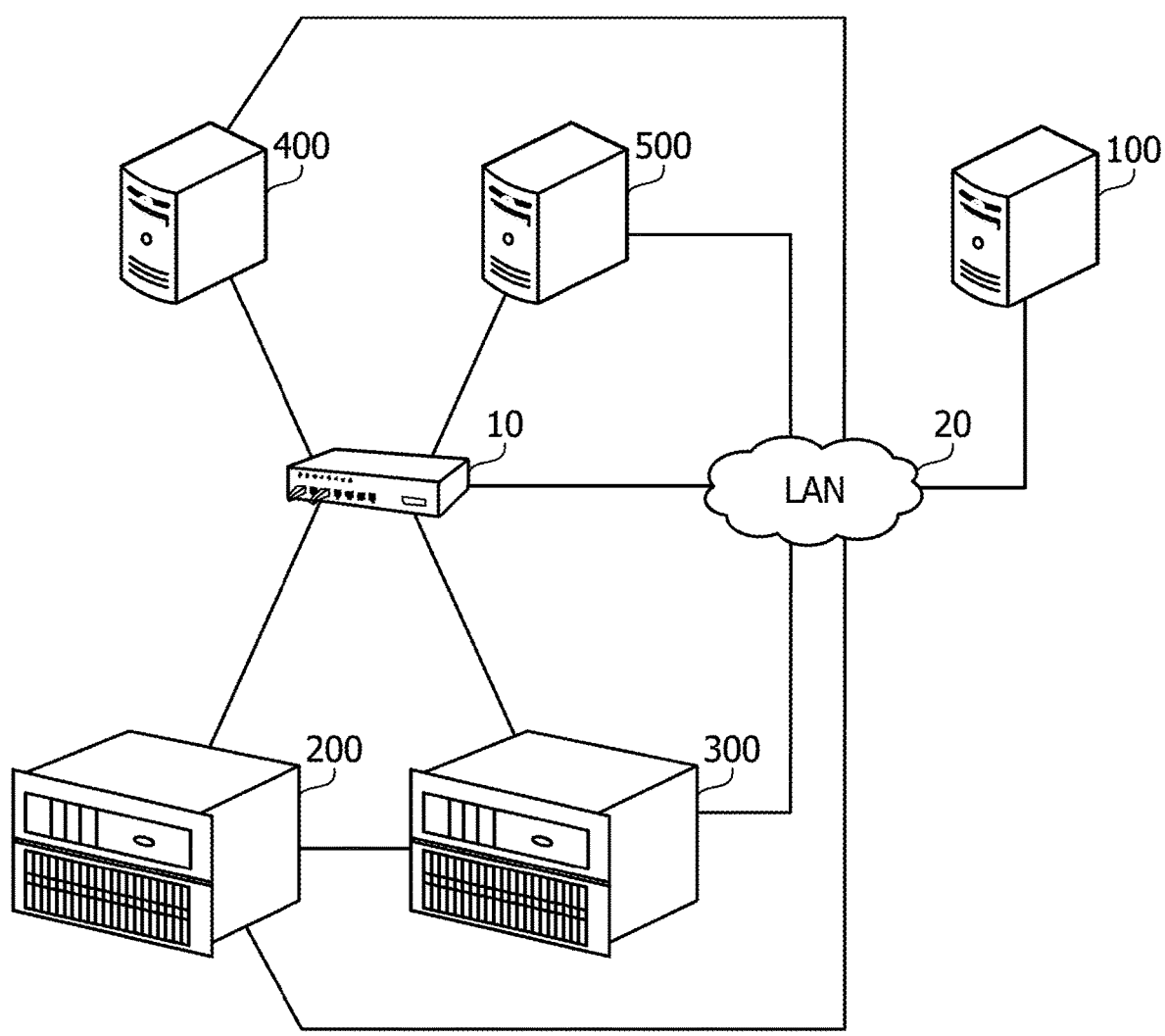
FIG. 2 is a diagram illustrating a storage system of a second embodiment.

FIG. 2 is a diagram illustrating a storage system of a second embodiment. The storage system of the second embodiment includes a management server 100 and storage apparatuses 200 and 300. The storage apparatuses 200 and 300 are coupled to a Fibre Channel (FC) switch 10. Business servers 400 and 500 are also coupled to the FC switch 10. The management server 100, the storage apparatuses 200 and 300, the business servers 400 and 500, and the FC switch 10 are coupled to a local area network (LAN) 20.

The management server 100 is a server computer that carries out operational management of the storage apparatuses 200 and 300, the business servers 400 and 500, and the FC switch 10. The management server 100 is one example of the information processing apparatus 1 of the first embodiment.

The storage apparatuses 200 and 300 may house plural storing devices such as HDD and SSD and offer a high-capacity storage area by the plural storing devices. The storage apparatuses 200 and 300 store various kinds of data used for business processing of the business servers 400 and 500. Furthermore, the storage apparatuses 200 and 300 store the same data. The storage apparatuses 200 and 300 are coupled by a path for carrying out remote copy of data. The path between the storage apparatuses 200 and 300 is called a Remote Equivalent Copy (REC) path in some cases. The storage apparatuses 200 and 300 are one example of the storage apparatuses 2 and 3 of the first embodiment. The storage apparatuses 200 and 300 may be what are called a disk array (or simply array).

The business servers 400 and 500 are server computers that execute applications to support business of a user. The business servers 400 and 500 access data stored in the storage apparatuses 200 and 300 through the FC switch 10 and execute business processing based on this data.

Figure 3:
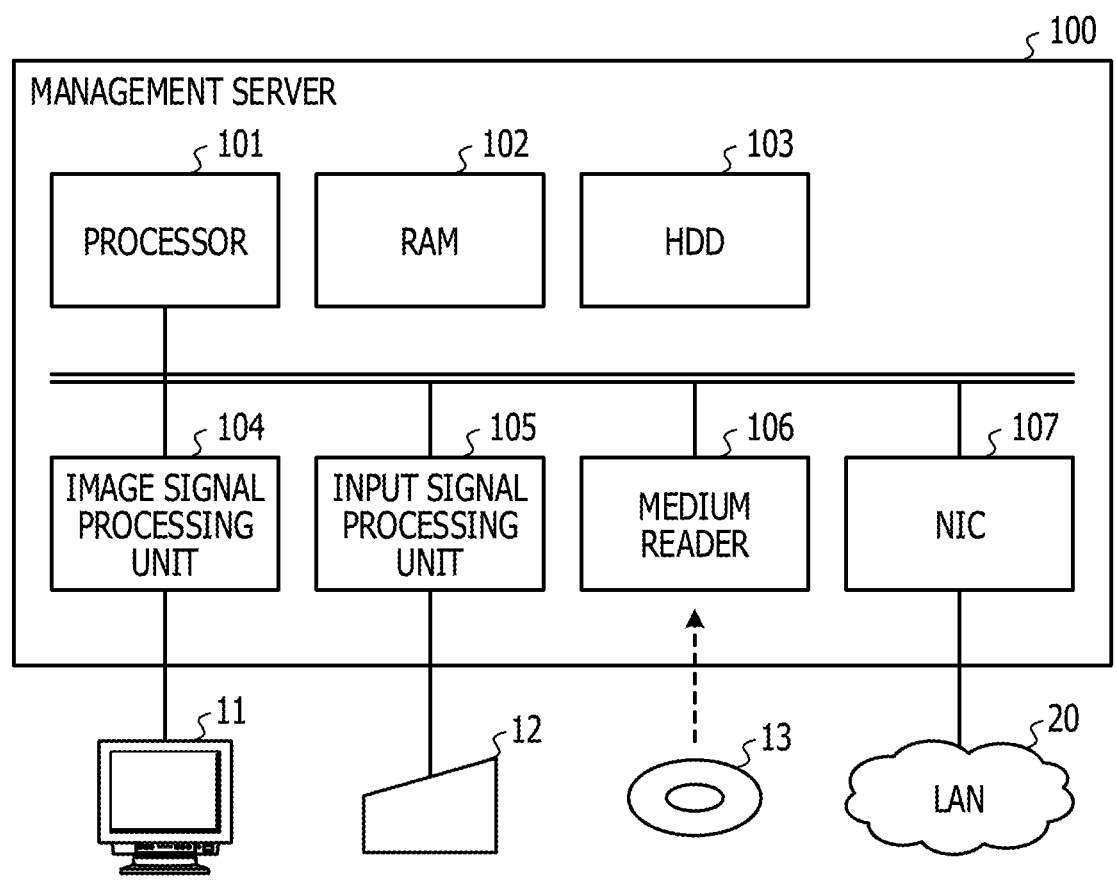
FIG. 3 is a diagram illustrating a hardware example of a management server.

FIG. 3 is a diagram illustrating a hardware example of the management server. The management server 100 includes a processor 101, a RAM 102, an HDD 103, an image signal processing unit 104, an input signal processing unit 105, a medium reader 106, and a network interface card (NIC) 107. The respective pieces of hardware are coupled to a bus of the management server 100.

The processor 101 is hardware that controls information processing of the management server 100. The processor 101 may be a multiprocessor. The processor 101 is a CPU, DSP, ASIC, FPGA, or the like. The processor 101 may be a combination of two or more elements among CPU, DSP, ASIC, FPGA, and so forth.

The RAM 102 is a main storing apparatus of the management server 100. The RAM 102 temporarily stores at least part of a program of an operating system (OS) or an application program which the processor 101 is caused to execute. Furthermore, the RAM 102 stores various kinds of data used for processing by the processor 101.

The HDD 103 is an auxiliary storing apparatus of the management server 100. The HDD 103 magnetically carries out writing and reading of data to and from a built-in magnetic disk. The HDD 103 stores the program of the OS, application programs, and various kinds of data. The management server 100 may include another kind of auxiliary storing apparatus such as an SSD instead of the HDD or in addition to the HDD and may include plural auxiliary storing apparatuses.

The image signal processing unit 104 outputs an image to a display 11 coupled to the management server 100 in accordance with a command from the processor 101. As the display 11, cathode ray tube (CRT) display, liquid crystal display, and so forth may be used.

The input signal processing unit 105 acquires an input signal from an input device 12 coupled to the management server 100 and outputs the input signal to the processor 101. As the input device 12, pointing devices such as mouse and touch panel, keyboard, and so forth may be used.

The medium reader 106 is an apparatus that reads a program or data recorded on a recording medium 13. As the recording medium 13, magnetic discs such as Flexible Disk (FD) and HDD, optical discs such as Compact Disc (CD) and Digital Versatile Disc (DVD), and Magneto-Optical disk (MO) may be used. Furthermore, it is also possible to use a non-volatile semiconductor memory such as a flash memory card as the recording medium 13. The medium reader 106 stores the program or data read from the recording medium 13 in the RAM 102 or the HDD 103 in accordance with a command from the processor 101, for example.

The NIC 107 carries out communication with other apparatuses through the LAN 20. The NIC 107 may be a wired communication interface and may be a wireless communication interface.

The business servers 400 and 500 also include hardware similar to the hardware of the management server 100. However, the business servers 400 and 500 further include a host bus adapter (HBA) for coupling to the FC switch 10.

Figure 4:
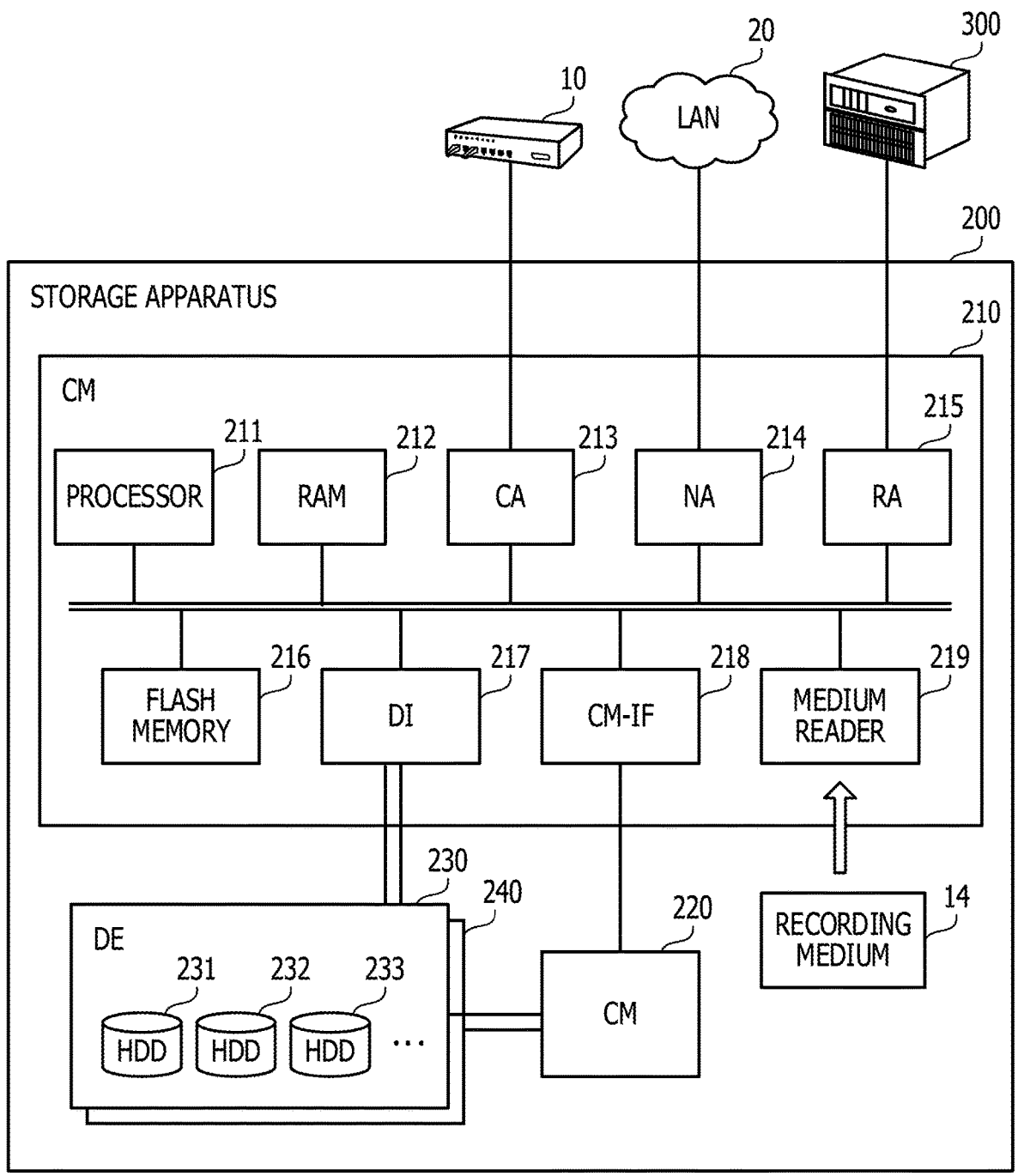
FIG. 4 is a diagram illustrating a hardware example of a storage apparatus.

FIG. 4 is a diagram illustrating a hardware example of the storage apparatus. The storage apparatus 200 includes controller modules (CM) 210 and 220 and drive enclosures (DE) 230 and 240.

The CMs 210 and 220 are a storage control apparatus that controls access to plural HDDs housed in the DEs 230 and 240. The DEs 230 and 240 house the plural HDDs. For example, the DE 230 includes HDDs 231, 232, 233, . . . . The DEs 230 and 240 may house another kind of storing devices such as SSDs instead of the HDDs or in addition to the HDDs. The CMs 210 and 220 combine the plural HDDs housed in the DEs 230 and 240 and construct a logical storage area based on a technique of RAID to store data used for processing of the business servers 400 and 500 in this storage area.

The CM 210 includes a processor 211, a RAM 212, a channel adapter (CA) 213, a network adapter (NA) 214, a remote adapter (RA) 215, a flash memory 216, a drive interface (DI) 217, a CM-interface (IF) 218, and a medium reader 219. These pieces of hardware are coupled to an internal bus of the CM 210. The CM 220 also includes hardware similar to the hardware of the CM 210.

The processor 211 is hardware that controls information processing of the CM 210. The processor 211 may be a multiprocessor. The processor 211 is a CPU, DSP, ASIC, FPGA, or the like. The processor 211 may be a combination of two or more elements among CPU, DSP, ASIC, FPGA, and so forth.

The RAM 212 is a main storing apparatus of the CM 210. The RAM 212 is a volatile semiconductor memory. As the RAM 212, static RAM (SRAM), dynamic RAM (DRAM), and so forth are used. The RAM 212 temporarily stores at least part of a program of an OS or firmware which the processor 211 is caused to execute. Furthermore, the RAM 212 stores various kinds of data used for processing by the processor 211.

The CA 213 is a communication interface that communicates with the business servers 400 and 500 through the FC switch 10. As the CA 213, an interface of the FC may be used, for example. The CM 210 may include plural CAs 213.

The NA 214 is a communication interface that communicates with the management server 100 through the LAN 20. As the NA 214, an interface of the Ethernet (registered trademark) may be used, for example.

The RA 215 is a communication interface that is coupled to the storage apparatus 300 and is used for remote copy of data. As the RA 215, an interface of the FC may be used, for example. The CM 210 may include plural RAs 215.

The flash memory 216 is an auxiliary storing apparatus of the CM 210. The flash memory 216 is a non-volatile semiconductor memory and stores programs including the OS and firmware and various kinds of data.

The DI 217 is an interface for communication with the DEs 230 and 240. For example, as the DI 217, an interface of the Serial Attached SCSI (SAS) (SCSI is abbreviation of Small Computer System Interface) may be used.

The CM-IF 218 is an interface for coupling to the CM 220. The CM 210 may carry out data access in cooperation with the CM 220 by using the CM-IF 218. For example, the CM 210 may be used as an active system and the CM 220 may be used as a standby system. Alternatively, both of the CMs 210 and 220 may be used as an active system and data access may be carried out in a distributed manner. In either case, when one of the CMs 210 and 220 is in failure, data access may be taken over by the other, so that stop of business of the user is suppressed.

The medium reader 219 is an apparatus that reads a program or data stored in a recording medium 14. As the recording medium 14, a non-volatile semiconductor memory such as a flash memory card may be used. It is also possible for the medium reader 219 to store the program or data read from the recording medium 14 in the RAM 212 or the flash memory 216 in accordance with a command from the processor 211, for example.

The storage apparatus 300 also includes hardware similar to the hardware of the storage apparatus 200.

Here, the storage area offered by the storage apparatuses 200 and 300 is managed in a unit called a volume. The storage apparatus 200 groups plural volumes that belong to the storage apparatus 200 to configure groups called transparent failover (TFO) groups. The TFO group is the unit of operation of failover on one storage apparatus. The TFO group includes one or more CA ports and volumes permitted to access these CA ports. The volume that belongs to the TFO group is called a transparent failover volume (TFOV). The storage apparatus 300 also includes TFOVs and TFO groups similarly. The storage apparatuses 200 and 300 make pairs in units of TFO groups (pairs are called TFO pairs in some cases) and use one TFO group as an active system and use the other TFO group as a standby system to configure a storage cluster in which failover is possible in units of pair. In the following description, the state of the TFO group used as the active system will be referred to as "active" and the state of the TFO group used as the standby system will be referred to as "standby."

For example, TFOVs whose host logical unit (HLU) numbers and capacities correspond with each other among TFOVs created by both of the storage apparatuses 200 and 300 become the synchronization target of data (pair). Here, the HLU number represents a logical unit number (LUN) recognized by the business servers 400 and 500 as hosts. One TFO group in the pair belongs to the storage apparatus 200 and the other TFO group belongs to the storage apparatus 300.

Furthermore, a TFO group whose initial state is "active" is called a primary TFO group in some cases. A TFO group whose initial state is "standby" is called a secondary TFO group. In some cases, processing of setting the state of a primary TFO group to standby and setting the state of a secondary TFO group to active is called "failover" and processing of setting the state of a secondary TFO group to standby and setting the state of a primary TFO group to active is called "failback."

Figure 5:
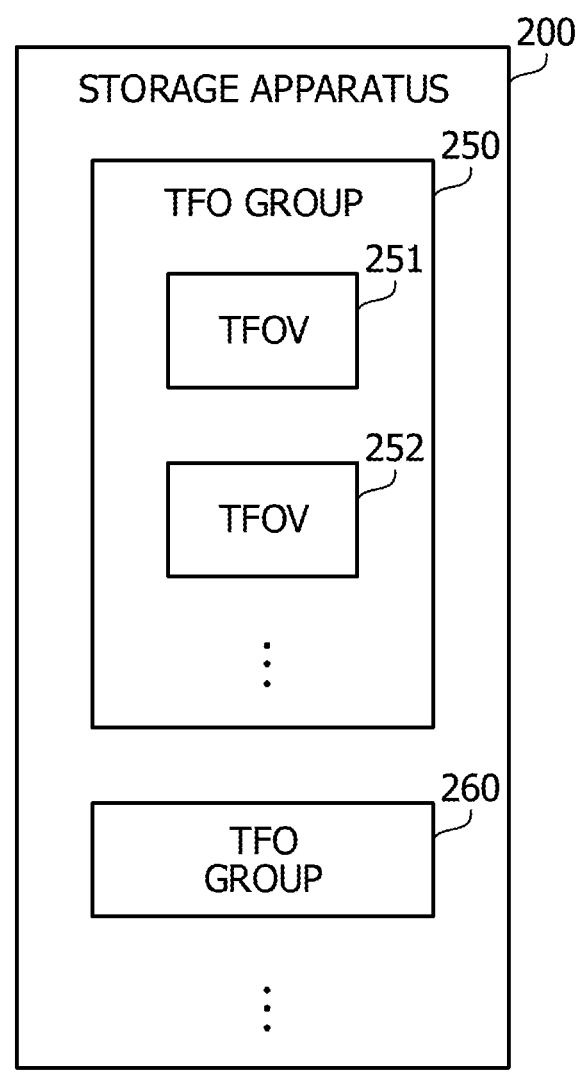
FIG. 5 is a diagram illustrating an example of TFO groups.

FIG. 5 is a diagram illustrating an example of TFO groups. The storage apparatus 200 includes TFO groups 250, 260, . . . . The TFO group 250 includes TFOVs 251, 252, . . . . The number of TFOVs that belong to a certain TFO group and the number of TFOVs that belong to another TFO group are the same in some cases and are different in other cases.

Figure 6:
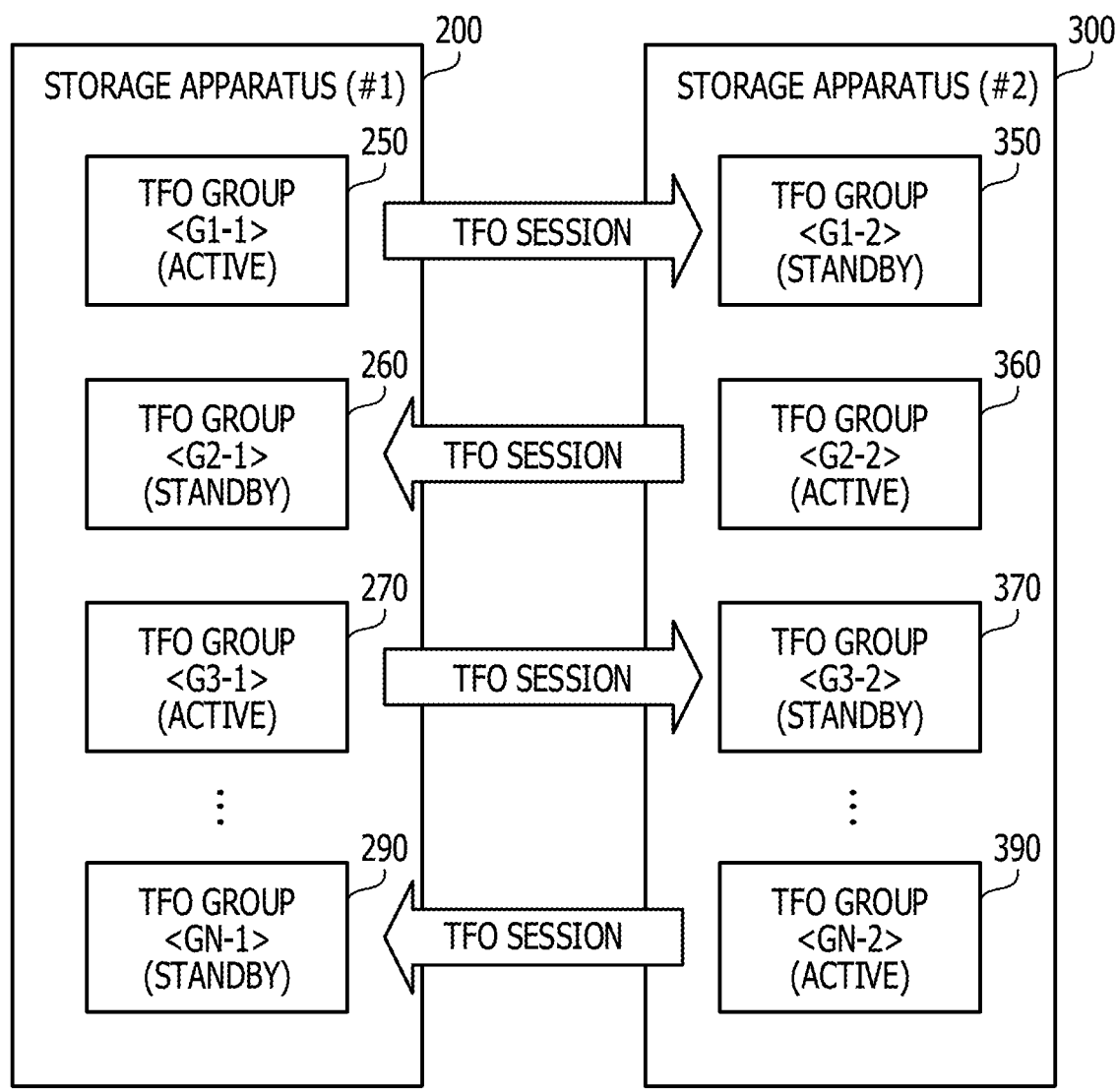
FIG. 6 is a diagram illustrating an example of pairs of TFO groups.

FIG. 6 is a diagram illustrating an example of pairs of TFO groups. The storage apparatus 200 includes the TFO groups 250, 260, 270, . . . , 290. The number of TFO groups 250, 260, 270, . . . , 290 is N (N is an integer equal to or larger than 4). The storage apparatus 300 includes TFO groups 350, 360, 370, . . . , 390. The number of TFO groups 350, 360, 370, . . . , 390 is N.

The pairs of TFO groups in the storage apparatuses 200 and 300 are as follows. The first pair is a pair of the TFO groups 250 and 350. The second pair is a pair of the TFO groups 260 and 360. The third pair is a pair of the TFO groups 270 and 370. The N-th pair is a pair of the TFO groups 290 and 390.

For example, at first, the TFO groups of the respective pairs are in the following state. Regarding the first pair, the TFO group 250 is active and the TFO group 350 is standby. Regarding the second pair, the TFO group 260 is standby and the TFO group 360 is active. Regarding the third pair, the TFO group 270 is active and the TFO group 370 is standby. Regarding the N-th pair, the TFO group 290 is standby and the TFO group 390 is active.

In each pair, a connection called a TFO session is established from the TFO group that is active to the TFO group that is standby through a REC path. By the TFO session, the contents of data update regarding the TFO group on the active side are remote-copied to the TFO group on the standby side. The remote copy may be carried out in synchronization with a request for data update to the TFO group on the active side or may be asynchronously carried out.

For example, a consideration will be made about the case in which the storage apparatus 200 carries out remote copy in synchronization with a request for data update from the business server 400. In this case, the storage apparatus 200 carries out data update of its own TFO group on the active side and carries out remote copy of the contents of the data update also to the storage apparatus 300. Then, the storage apparatus 200 sends a response indicating the completion of the data update to the business server 400.

Furthermore, a consideration will be made about the case in which the storage apparatus 200 carries out remote copy asynchronously with a request for data update from the business server 400. In this case, after carrying out data update of its own TFO group on the active side, the storage apparatus 200 sends a response indicating the completion of the data update to the business server 400. At a subsequent given timing, the storage apparatus 200 carries out remote copy of the contents of the data update also to the storage apparatus 300.

Here, the identification number of the storage apparatus 200 is defined as "1." The identification number of the storage apparatus 300 is defined as "2." As one example, the identification information of each TFO group is defined as follows by using the identification number of the pair (coupling of character "G" and number) and the identification number of the storage apparatus 200 or 300.

The identification information of the TFO group 250 is "G1-1." The identification information of the TFO group 260 is "G2-1." The identification information of the TFO group 270 is "G3-1." The identification information of the TFO group 290 is "GN-1." The identification information of the TFO group 350 is "G1-2." The identification information of the TFO group 360 is "G2-2." The identification information of the TFO group 370 is "G3-2." The identification information of the TFO group 390 is "GN-2."

The management server 100 manages the TFOVs and the TFO groups in the storage apparatuses 200 and 300 by using these pieces of identification information. However, the TFOVs and the TFO groups may be managed by a different method from the exemplified method.

Figure 7:
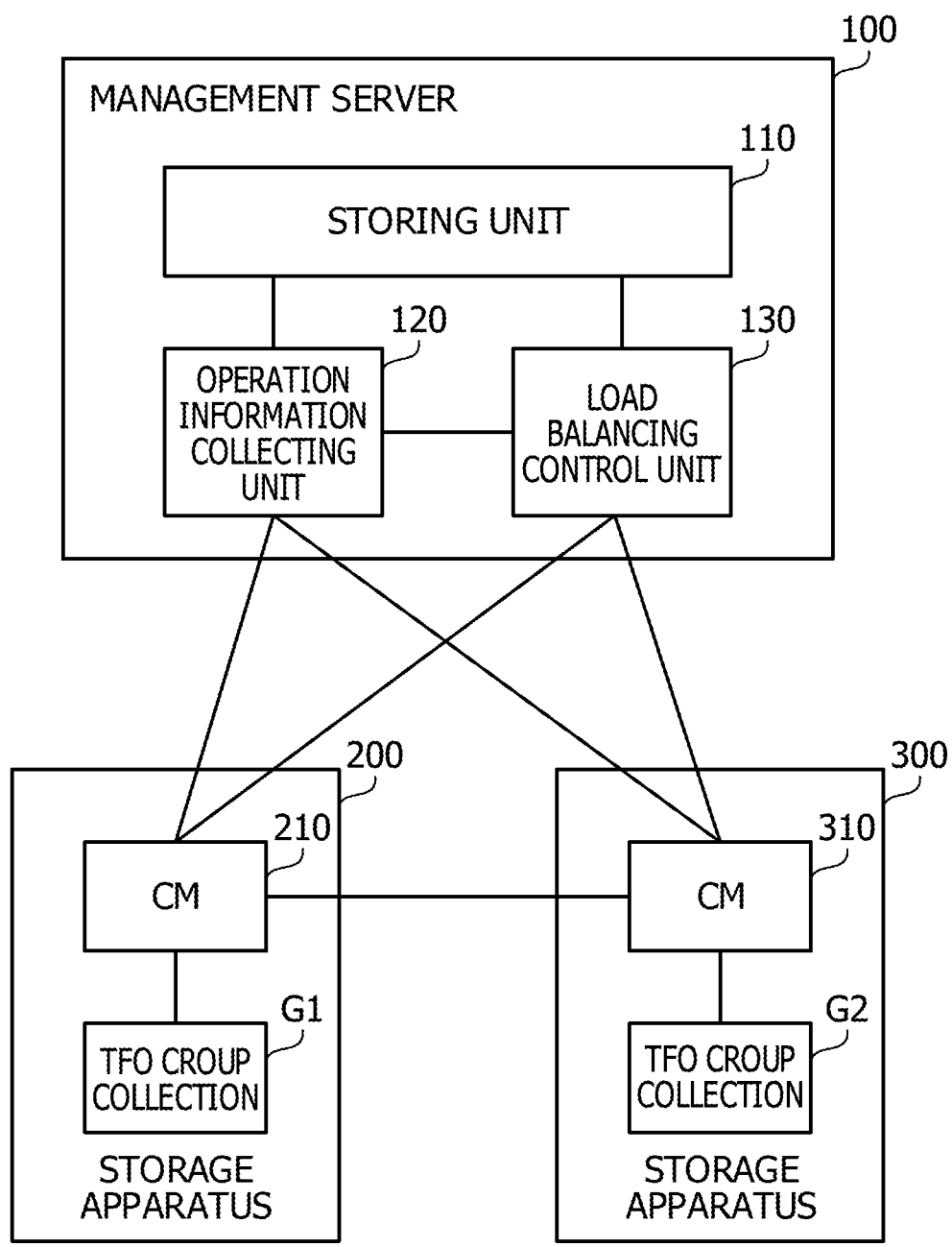
FIG. 7 is a diagram illustrating a function example of a management server.

FIG. 7 is a diagram illustrating a function example of a management server. The management server 100 includes a storing unit 110, an operation information collecting unit 120, and a load balancing control unit 130.

The storing unit 110 is implemented by using a storage area of the RAM 102 or the HDD 103, for example. The operation information collecting unit 120 and the load balancing control unit 130 are implemented by the processor 101. For example, the processor 101 exerts functions of the operation information collecting unit 120 and the load balancing control unit 130 by executing a program stored in the RAM 102. The operation information collecting unit 120 and the load balancing control unit 130 may be implemented by hard-wired logic such as an FPGA or ASIC.

The storing unit 110 stores information for managing the TFOVs that belong to the TFO groups and information for managing whether the state of a respective one of the TFO groups is active or standby. Furthermore, the storing unit 110 stores information on the throughput of each TFOV collected by the operation information collecting unit 120 and information on the throughput of each TFO group analyzed by the load balancing control unit 130.

The operation information collecting unit 120 collects operation information of the storage apparatuses 200 and 300 from the storage apparatuses 200 and 300 and stores the operation information in the storing unit 110. The operation information includes performance data (performance information) that represents the throughput of each TFOV. Here, the throughput is the average, in a given period (t), of the total of the amount (x) of data read out from a TFOV in response to an access request of the business server 400 or 500 and the amount (y) of data written to the relevant volume in the given time t. For example, the throughput is an amount represented by (x+y)/t (for example, unit is bytes/second). However, the throughput may be an amount represented by x/t or y/t.

The load balancing control unit 130 carries out load balancing control in the storage apparatuses 200 and 300 based on the operation information collected by the operation information collecting unit 120. For example, the load balancing control unit 130 analyzes the throughput in units of TFO group based on the throughput of each TFOV. Furthermore, the load balancing control unit 130 analyzes the throughput in units of storage apparatuses based on the throughput of each TFO group. When detecting that an inequality (imbalance) has been generated in the load of the storage apparatuses 200 and 300, the load balancing control unit 130 extracts the pair of TFO groups in which switching of active/standby is to be carried out based on the analysis result. Then, the load balancing control unit 130 instructs the storage apparatuses 200 and 300 to switch the active system (active) and the standby system (standby) regarding the two TFO groups that belong to the extracted pair of the switching target.

Here, the load balancing control unit 130 extracts the pair of TFO groups in which switching of active/standby is to be carried out in such a manner that the load of the storage apparatus with the higher load is transferred to the storage apparatus with the lower load. It may also be said that the instruction of switching of active/standby is an instruction of failover ("failover" mainly refers to switching of active system/standby system at the time of failure, but switching of active system/standby system for load balancing is also referred to as failover for convenience in some cases).

The CMs 210 and 310 measure the throughput (for example, average value in a given time interval) of each TFOV and offer the throughput to the operation information collecting unit 120. The CMs 210 and 310 implement failover in the storage cluster in accordance with an instruction of failover by the load balancing control unit 130. In one example, the CMs 210 and 310 carry out the failover by sharing World Wide Port Name (WWPN)/World Wide Node Name (WWNN) in the respective CA ports and controlling the link state of each CA port. The set of CA ports whose WWPN/WWNN is shared is called a "CA port pair." The CA port pair may be set for each of pairs of TFO groups. Due to the pairing of CA ports, for example, the WWPN/WWNN of the CA port on the side of the primary TFO group is set in the CA port on the side of the secondary TFO group as logical WWPN/WWNN and link-down of the CA port on the side of the secondary TFO group is caused. The CMs 210 and 310 carry out failover in the pair of TFO groups by carrying out link-down of the CA port on the side of the primary TFO group and link-up of the CA port on the side of the secondary TFO group. However, the method of failover is not limited to such a method and another method (for example, setting of changing the transfer destination of access is carried out to the FC switch 10 by the load balancing control unit 130) may be used.

Here, the storage apparatus 200 includes a TFO group collection G1. The TFO group collection G1 includes the TFO groups 250, 260, 270, . . . , 290 exemplified in FIG. 6. Furthermore, the storage apparatus 300 includes a TFO group collection G2. The TFO group collection G2 includes the TFO groups 350, 360, 370, . . . , 390 exemplified in FIG. 6.

Due to failover, part of the TFO groups of the TFO group collection G1 that belongs to the storage apparatus 200 is changed from active to standby and part of the TFO groups of the TFO group collection G2 that belongs to the storage apparatus 300 is changed from standby to active. Alternatively, in some cases, part of the TFO groups of the TFO group collection G2 that belongs to the storage apparatus 300 is changed from active to standby and part of the TFO groups of the TFO group collection G1 that belongs to the storage apparatus 200 is changed from standby to active.

Figure 8:
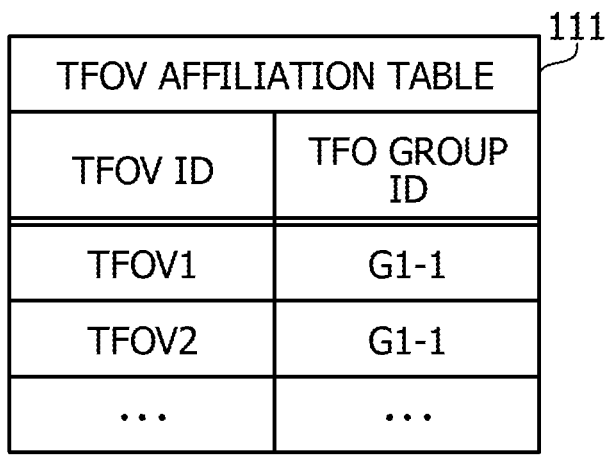
FIG. 8 is a diagram illustrating an example of a TFOV affiliation table.

FIG. 8 is a diagram illustrating an example of a TFOV affiliation table. A TFOV affiliation table 111 is stored in the storing unit 110 in advance. The TFOV affiliation table 111 includes items of TFOV identifier (ID) and TFO group ID.

In the item of the TFOV ID, the identification information of the TFOV is registered. In the item of the TFO group ID, the identification information of the TFO group of the affiliation of the TFOV is registered.

For example, in the TFOV affiliation table 111, information in which the TFOV ID is "TFOV1" and the TFO group ID is "G1-1" is registered. This indicates that the TFOV represented by the TFOV ID "TFOV1" belongs to the TFO group represented by the TFO group ID "G1-1."

In the TFOV affiliation table 111, the TFO group ID of the TFO group of the affiliation is similarly registered also regarding the other TFOVs.

Figure 9:
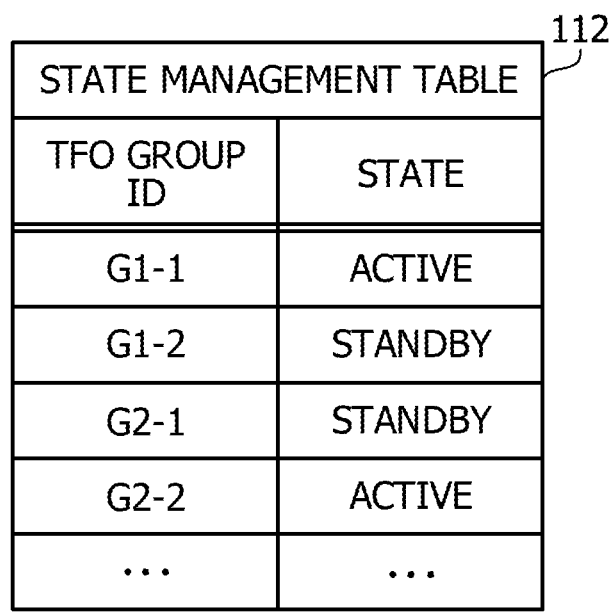
FIG. 9 is a diagram illustrating an example of a state management table.

FIG. 9 is a diagram illustrating an example of a state management table. A state management table 112 is stored in the storing unit 110 in advance. The state management table 112 is updated by the operation information collecting unit 120 according to change in the state of each TFO group (change in active/standby). The state management table 112 includes information on the TFO group ID and the state.

In the item of the TFO group ID, the identification information of the TFO group is registered. In the item of the state, information that represents active or standby is registered.

For example, in the state management table 112, information in which the TFO group ID is "G1-1" and the state is "active" is registered. This indicates that the state of the TFO group represented by the TFO group ID "G1-1" is "active."

Furthermore, in the state management table 112, information in which the TFO group ID is "G1-2" and the state is "standby" is registered. This indicates that the state of the TFO group represented by the TFO group ID "G1-2" is "standby."

In the state management table 112, the state that represents active/standby is similarly registered also regarding the other TFO groups.

Figure 10:
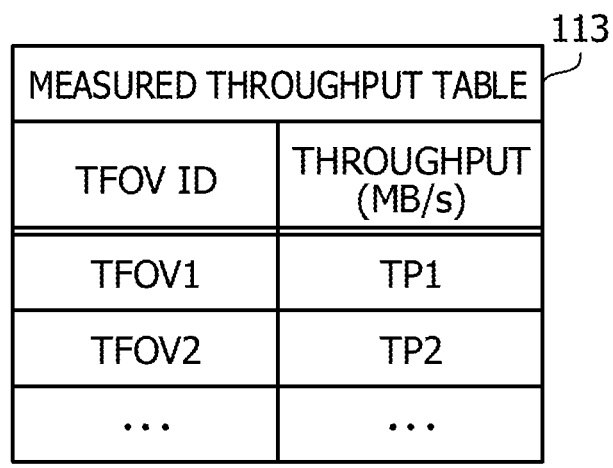
FIG. 10 is a diagram illustrating an example of a measured throughput table.

FIG. 10 is a diagram illustrating an example of a measured throughput table. A measured throughput table 113 is created by the operation information collecting unit 120 and is stored in the storing unit 110. The measured throughput table 113 includes items of TFOV ID and throughput.

In the item of the TFOV ID, the identification information of the TFOV is registered. In the item of the throughput, the throughput of each TFOV acquired from the storage apparatuses 200 and 300 is registered. Here, the unit of the throughput is megabytes per second (MB/s), for example.

For example, in the measured throughput table 113, information in which the TFOV ID is "TFOV1" and the throughput is "TP1" is registered. This indicates that the throughput of the TFOV represented by the TFOV ID "TFOV1" is TP1 (MB/s).

In the measured throughput table 113, the throughput acquired from the storage apparatuses 200 and 300 is similarly registered also regarding the other TFOV IDs.

The TFOV that belongs to the standby TFO group does not accept access by the business servers 400 and 500. For this reason, the throughput regarding the TFOV that belongs to the standby TFO group may be considered as 0. The operation information collecting unit 120 may regard the throughput regarding the TFOV that belongs to the standby TFO group as 0 and omit collection of the throughput of this TFOV.

Figure 11:
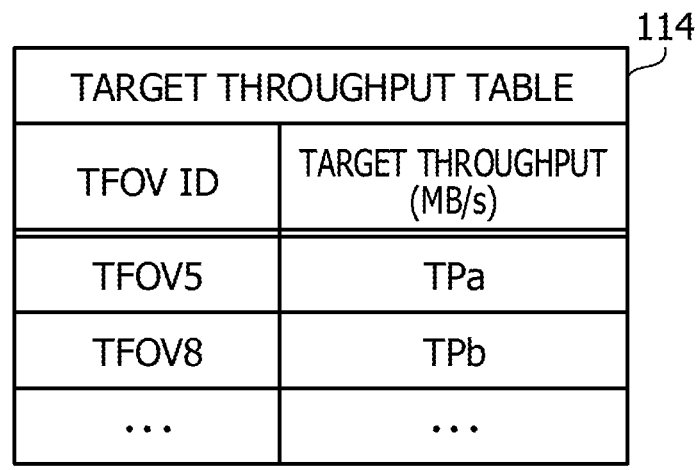
FIG. 11 is a diagram illustrating an example of a target throughput table.

FIG. 11 is a diagram illustrating an example of a target throughput table. A target throughput table 114 is stored in the storing unit 110 in advance. The target throughput table 114 includes items of TFOV ID and target throughput.

In the item of the TFOV ID, the identification information of the TFOV is registered. In the item of the target throughput, the throughput of the target (target throughput) in the relevant TFOV is registered. The unit of the target throughput is megabytes per second (MB/s), for example. The setting of the target throughput for the TFOV is arbitrary. The record of a TFOV without setting of the target throughput is not registered in the target throughput table 114.

For example, in the target throughput table 114, information in which the TFOV ID is "TFOV5" and the target throughput is "TPa" is registered. This indicates that the target throughput of the TFOV represented by the TFOV ID "TFOV5" is TPa (MB/s).

In the target throughput table 114, the target throughput is similarly registered also regarding the other TFOVs.

Figure 12:
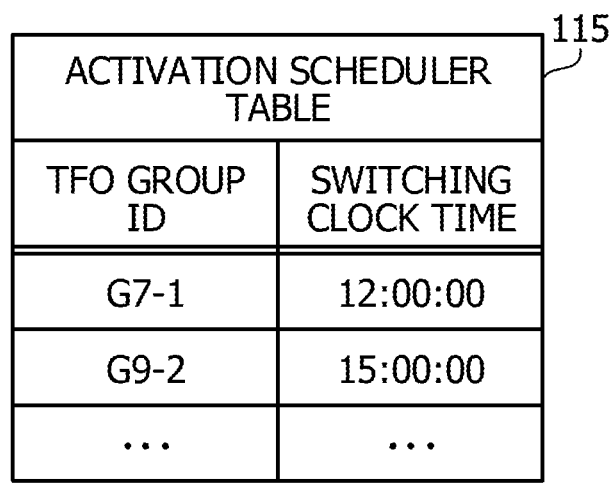
FIG. 12 is a diagram illustrating an example of an activation schedule table.

FIG. 12 is a diagram illustrating an example of an activation schedule table. An activation schedule table 115 is stored in the storing unit 110 in advance. The activation schedule table 115 includes items of TFO group ID and switching clock time.

In the item of the TFO group ID, the identification information of the TFO group is registered. In the item of the switching clock time, the clock time when the relevant TFO group is made active is registered.

For example, in the activation schedule table 115, information in which the TFO group ID is "G7-1" and the switching clock time is "12:00:00" is registered. This indicates that, if the TFO group represented by the TFO group ID "G7-1" is in the standby state at the timing when the clock time becomes twelve o'clock and zero seconds, this TFO group is changed to the active state.

Next, the procedure of processing by the management server 100 will be described.

Figure 13:
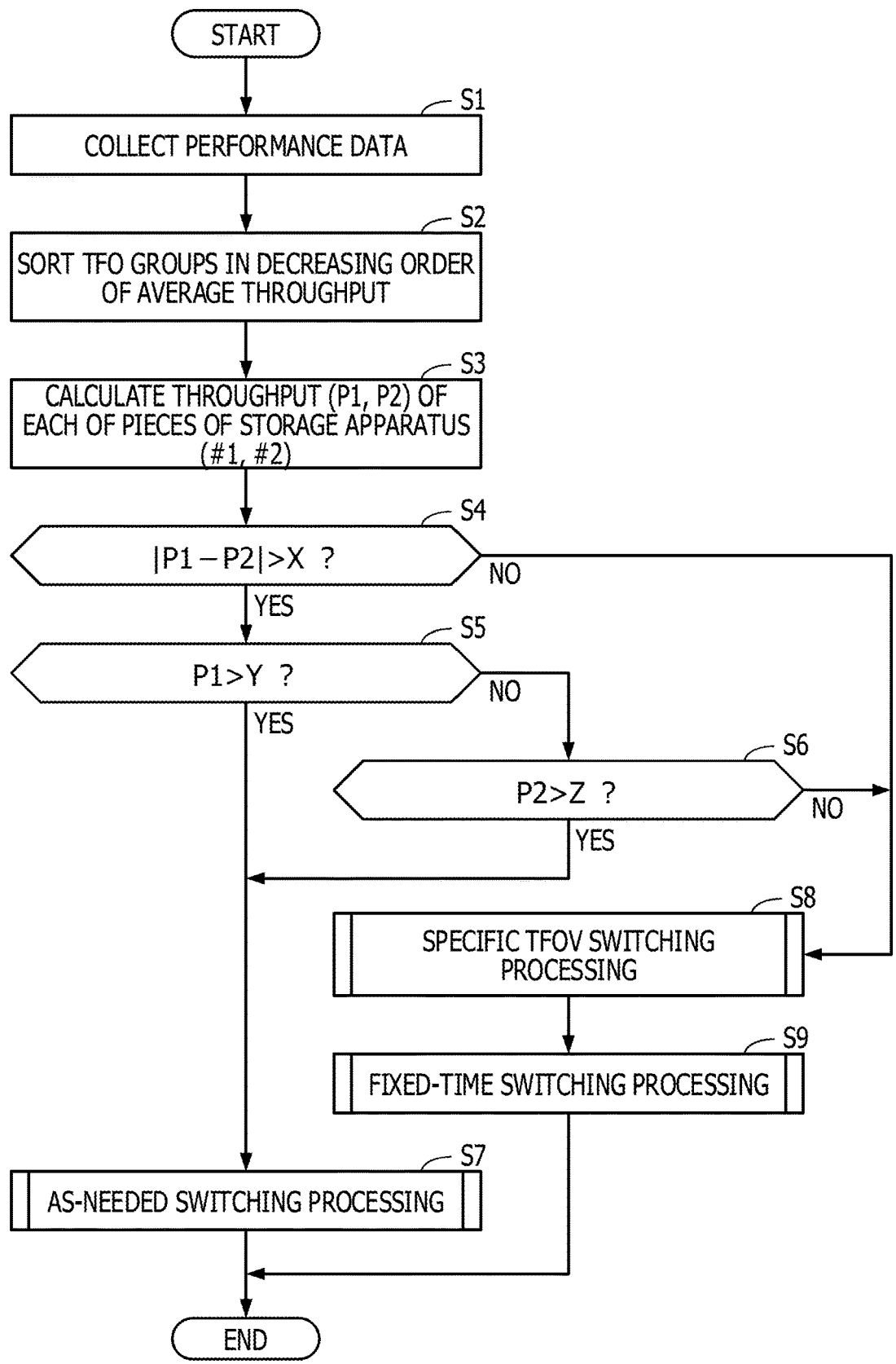
FIG. 13 is a flowchart illustrating a processing example of a management server.

FIG. 13 is a flowchart illustrating a processing example of a management server. The processing represented in FIG. 13 will be described below along the step number. The management server 100 carries out the procedure described below at a given cycle (for example, cycle of 30 seconds).

(S1) The operation information collecting unit 120 collects the performance data of each TFOV from the storage apparatuses 200 and 300 and registers the performance data in the measured throughput table 113 stored in the storing unit 110. The performance data collected by the operation information collecting unit 120 is the average of the throughput (average throughput) of each TFOV in a given cycle.

(S2) The load balancing control unit 130 refers to the TFOV affiliation table 111 and the measured throughput table 113 stored in the storing unit 110 and calculates the average throughput of each TFO group. The average throughput of the TFO group is the total sum of the average throughputs of the TFOVs that belong to this TFO group. The load balancing control unit 130 sorts the TFO groups in decreasing order of the average throughput of each TFO group.

(S3) The load balancing control unit 130 calculates the throughput of each of the storage apparatuses 200 and 300. The throughput of the storage apparatus 200 is defined as P1. The throughput of the storage apparatus 300 is defined as P2. The throughput P1 is the total sum of the average throughputs of the TFO groups that belong to the storage apparatus 200. The throughput P2 is the total sum of the average throughputs of the TFO groups that belong to the storage apparatus 300.

(S4) The load balancing control unit 130 determines whether or not |P1−P2|>X is satisfied. Here, X is a reference value that represents the difference in the performance (total throughput) between the storage apparatuses 200 and 300 and is set to an arbitrary value in advance. In the case of |P1−P2|>X, the load balancing control unit 130 forwards the processing to a step S5. In the case of |P1−P2|≤X, the load balancing control unit 130 forwards the processing to a step S8.

(S5) The load balancing control unit 130 determines whether or not P1>Y is satisfied. Here, Y is an average throughput expected regarding the storage apparatus 200 (expected value of the throughput). The value of Y is set in advance. In the case of P1>Y, the load balancing control unit 130 forwards the processing to a step S7. In the case of P1≤Y, the load balancing control unit 130 forwards the processing to a step S6.

(S6) The load balancing control unit 130 determines whether or not P2>Z is satisfied. Here, Z is an average throughput expected regarding the storage apparatus 300 (expected value of the throughput). The value of Z is set in advance. In the case of P2>Z, the load balancing control unit 130 forwards the processing to the step S7. In the case of P2≤Z, the load balancing control unit 130 forwards the processing to the step S8.

(S7) The load balancing control unit 130 executes as-needed switching processing. Details of the as-needed switching processing will be described later. Then, the load balancing control unit 130 ends the processing.

(S8) The load balancing control unit 130 executes specific TFOV switching processing. Details of the specific TFOV switching processing will be described later.

(S9) The load balancing control unit 130 executes fixed-time switching processing. Details of the fixed-time switching processing will be described later. Then, the load balancing control unit 130 ends the processing.

As represented in the steps S4, S5, and S6, the load balancing control unit 130 calculates the throughput (performance value) of each of the storage apparatuses 200 and 300 based on the performance data of each TFO group and extracts the pair of the switching target according to comparison of the throughput. For example, the load balancing control unit 130 detects an inequality of the load if the difference in the throughput between the storage apparatuses 200 and 300 surpasses the reference value (first reference value) and the throughput of either one of the storage apparatuses 200 and 300 surpasses the expected value (second reference value). When detecting an inequality of the load in the storage apparatuses 200 and 300, the load balancing control unit 130 intends leveling of the storage apparatuses 200 and 300 by the as-needed switching processing.

Figure 14:
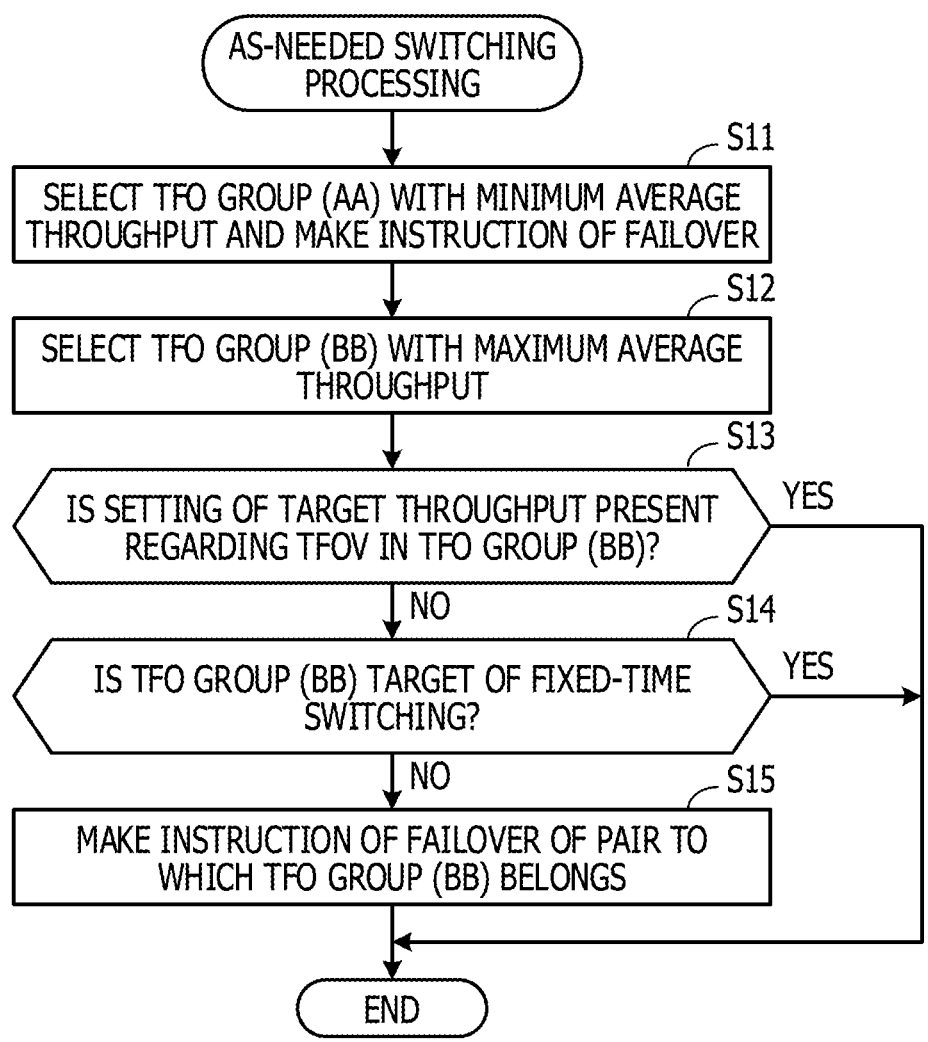
FIG. 14 is a flowchart illustrating an example of as-needed switching processing.

FIG. 14 is a flowchart illustrating an example of the as-needed switching processing. The processing represented in FIG. 14 will be described below along the step number. The procedure of FIG. 14 is equivalent to the step S7 in FIG. 13.

(S11) The load balancing control unit 130 selects the storage apparatus whose average throughput in units of storage apparatuses is lower in the storage apparatuses 200 and 300. The load balancing control unit 130 selects the TFO group (defined as AA) with the minimum average throughput in the TFO groups that belong to the selected storage apparatus and instructs the storage apparatuses 200 and 300 to carry out failover of the pair to which the TFO group (AA) belongs. The load balancing control unit 130 carries out the selection of the TFO group (AA) in the step S11 based on the TFOV affiliation table 111 and the measured throughput table 113 stored in the storing unit 110.

(S12) The load balancing control unit 130 selects the storage apparatus whose average throughput in units of storage apparatuses is higher in the storage apparatuses 200 and 300. The load balancing control unit 130 selects the TFO group (defined as BB) with the maximum average throughput in the TFO groups that belong to the selected storage apparatus. The load balancing control unit 130 carries out the selection of the TFO group (BB) in the step S12 based on the TFOV affiliation table 111 and the measured throughput table 113.

(S13) The load balancing control unit 130 refers to the target throughput table 114 stored in the storing unit 110 and determines whether or not a TFOV about which setting of the target throughput is present exists in the TFOVs that belong to the TFO group (BB). If a TFOV about which setting of the target throughput is present exists in the relevant TFO group, the load balancing control unit 130 ends the processing. If a TFOV about which setting of the target throughput is present does not exist in the relevant TFO group, the load balancing control unit 130 forwards the processing to a step S14.

(S14) The load balancing control unit 130 refers to the activation schedule table 115 stored in the storing unit 110 and determines whether or not the TFO group (BB) is the target of fixed-time switching. If the TFO group (BB) is the target of fixed-time switching (setting of a switching clock time when activation is carried out is present regarding this TFO group (BB)), the load balancing control unit 130 ends the processing. If the TFO group (BB) is not the target of fixed-time switching, the load balancing control unit 130 forwards the processing to a step S15.

(S15) The load balancing control unit 130 instructs the storage apparatuses 200 and 300 to carry out failover of the pair to which the TFO group (BB) belongs. Then, the load balancing control unit 130 ends the processing. When the failover is carried out, the load balancing control unit 130 updates the state management table 112 stored in the storing unit 110 regarding the relevant TFO groups.

As above, for example, if the throughput of the storage apparatus 200 (first performance value) is higher than the throughput of the storage apparatus 300 (second performance value), the load balancing control unit 130 selects a group of an active system from the TFO groups that belong to the storage apparatus 200. Then, the load balancing control unit 130 extracts a first pair to which the selected group of the active system belongs as the switching target. This may assume part of the load of the storage apparatus 200 with the higher load by the storage apparatus 300 with the lower load.

Furthermore, the load balancing control unit 130 selects another group of an active system including a throughput that represents a second value smaller than the throughput (first value) of the above-described group of the active system in the first pair from the TFO groups that belong to the storage apparatus 300. Then, the load balancing control unit 130 extracts a second pair to which the selected other group of the active system belongs as the switching target in addition to the first pair. This allows control to keep the load of the storage apparatus 300 that assumes the load from becoming too high on the contrary, so that leveling of the load of the storage apparatuses 200 and 300 may be properly carried out.

For example, the load balancing control unit 130 extracts, as the pairs of the switching target, the pair to which the TFO group with the maximum throughput in the storage apparatus whose total sum of the throughputs of the TFOVs is larger belongs and the pair to which the TFO group with the minimum throughput in the storage apparatus whose total sum of the throughputs of the TFOVs is smaller belongs. This allows the difference in the throughput between the storage apparatuses 200 and 300 after the switching to be made smaller than the difference before the switching and may properly balance the load of the storage apparatuses 200 and 300. For example, by employing the pair to which the TFO group with the maximum throughput in the storage apparatus with the higher load belongs as the switching target, the load of this storage apparatus may be efficiently transferred to the other storage apparatus with a small number of times of switching. This may reduce the possibility that the number of times of switching (the number of times of execution of failover) increases and the business of the user is affected.

Besides the above, the load balancing control unit 130 may extract, as the pairs of the switching target, the pair to which the TFO group with the maximum throughput in the storage apparatus whose total sum of the throughputs of the TFOVs is larger belongs and the pair to which the TFO group with the maximum throughput in the storage apparatus whose total sum of the throughputs of the TFOVs is smaller belongs. Also in this case, the difference in the throughput between the storage apparatuses 200 and 300 after the switching may be made smaller than the difference before the switching and the load of the storage apparatuses 200 and 300 may be properly balanced.

Furthermore, the load balancing control unit 130 may select the extraction method with which the difference between the throughputs of the storage apparatuses 200 and 300 after the switching (throughputs expected regarding the storage apparatuses 200 and 300) becomes the smallest among these plural extraction methods. This may intend further leveling of the load of the storage apparatuses 200 and 300.

Moreover, in the example of FIG. 14, the procedure is represented in which, by carrying out the determinations of the steps S13 and S14, the load balancing control unit 130 skips the as-needed switching processing of the TFO group (BB) if load balancing is carried out by the specific TFOV switching processing or the fixed-time switching processing. However, the load balancing control unit 130 may skip the determinations of the step S13 and S14 and carry out the step S15 after the step S12.

Figure 15:
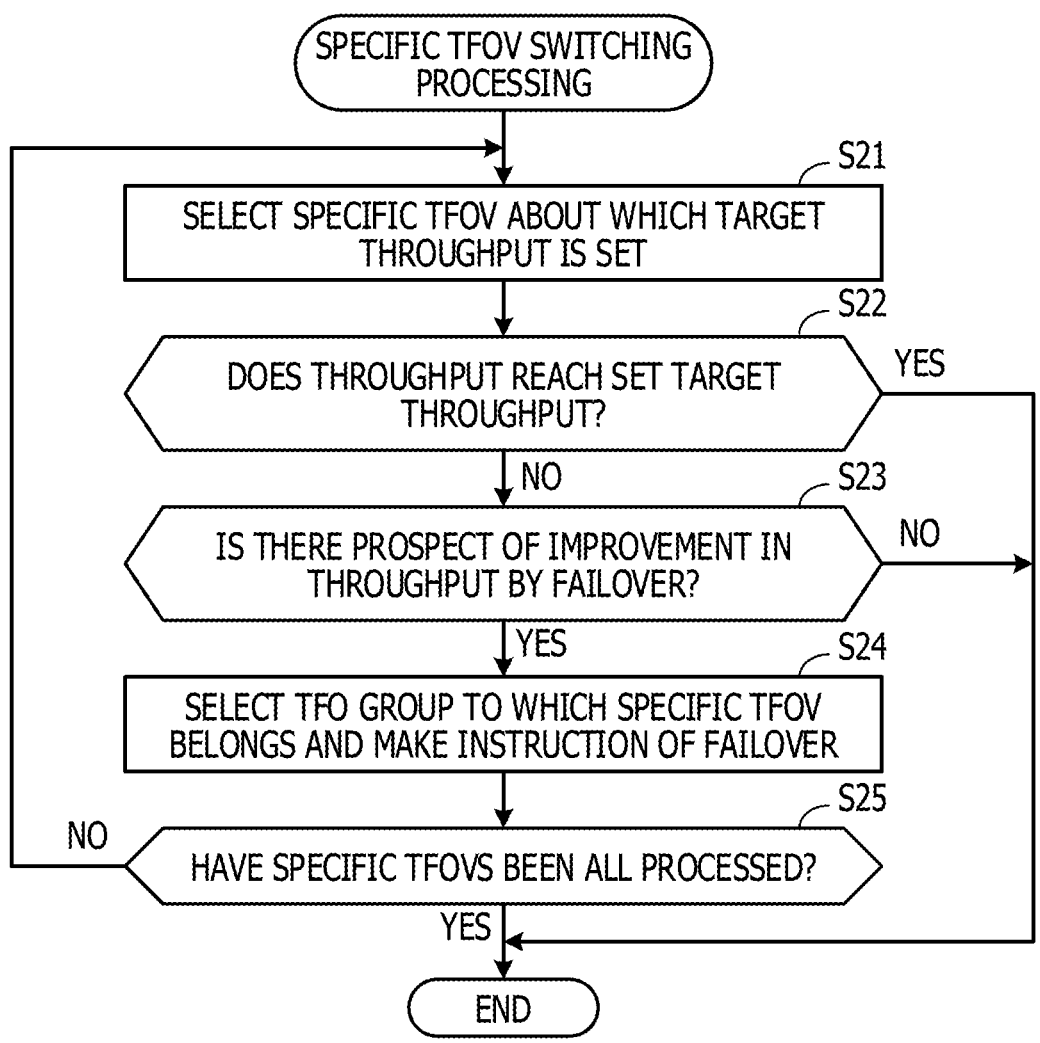
FIG. 15 is a flowchart illustrating an example of specific TFOV switching processing.

FIG. 15 is a flowchart illustrating an example of the specific TFOV switching processing. The processing represented in FIG. 15 will be described below along the step number. The procedure of FIG. 15 is equivalent to the step S8 in FIG. 13.

(S21) The load balancing control unit 130 refers to the target throughput table 114 stored in the storing unit 110 and selects a TFOV about which the target throughput is set (referred to as the specific TFOV). The load balancing control unit 130 selects the specific TFOV from the TFOVs that belong to a TFO group that is presently in the active state.

(S22) The load balancing control unit 130 refers to the measured throughput table 113 and determines whether or not the throughput of the specific TFOV reaches the set target throughput. If the throughput of the specific TFOV reaches the target throughput, the load balancing control unit 130 ends the processing. If the throughput of the specific TFOV does not reach the target throughput, the load balancing control unit 130 forwards the processing to a step S23.

(S23) The load balancing control unit 130 determines whether or not there is a prospect of improvement in the throughput by failover regarding the specific TFOV. If there is a prospect of improvement in the throughput, the load balancing control unit 130 forwards the processing to a step S24. If there is no prospect of improvement in the throughput, the load balancing control unit 130 ends the processing. Here, the case in which "there is a prospect of improvement in the throughput by failover" represents the following case, for example. For example, this case is the case in which the throughput of the storage apparatus to which the specific TFOV to which attention is presently paid belongs (average throughput in units of storage) is higher than the throughput of the other storage apparatus (average throughput in units of storage). In this case, by carrying out failover regarding the TFO group to which the specific TFOV belongs, the storage apparatus in charge of access to the specific TFOV is changed to the storage apparatus with the lower load. Thus, the improvement in the throughput with respect to the specific TFOV may be expected.

(S24) The load balancing control unit 130 selects the TFO group to which the specific TFOV belongs and instructs the storage apparatuses 200 and 300 to carry out failover of the pair to which this TFO group belongs. When the failover is carried out, the load balancing control unit 130 updates the state management table 112 stored in the storing unit 110 regarding the relevant TFO groups.

(S25) The load balancing control unit 130 determines whether or not the specific TFOVs registered in the target throughput table 114 have been all processed. If all have been processed, the load balancing control unit 130 ends the processing. If all have not been processed, the load balancing control unit 130 forwards the processing to the step S21.

As the result of the processing of the step S24, the throughput of the specific TFOV is subtracted from the throughput of the original storage apparatus and is added to the throughput of the storage apparatus of the counterpart. In the case of repeatedly carrying out the step S23 while changing the specific TFOV to which attention is paid, the load balancing control unit 130 updates the throughput in units of storage apparatuses regarding each storage apparatuses according to failover of the present round and carries out the determination of the step S23 of the next round.

As above, the storing unit 110 stores information that represents the target performance of the specific volume (target throughput table 114). Furthermore, when detecting the specific TFOV that does not reach the target performance based on the collected performance information of each TFOV, the load balancing control unit 130 extracts the pair to which the specific TFOV belongs as the switching target according to comparison of the throughputs (performance values) of the storage apparatuses 200 and 300.

For example, a consideration will be made about the case in which the specific TFOV that does not reach the target performance belongs to the storage apparatus 200. At this time, the load balancing control unit 130 makes an instruction of failover of the pair to which the specific TFOV belongs if the throughput of the storage apparatus 300 is lower than the throughput of the storage apparatus 200. This may enhance the possibility that the target throughput set about the specific TFOV is achieved.

Figure 16:
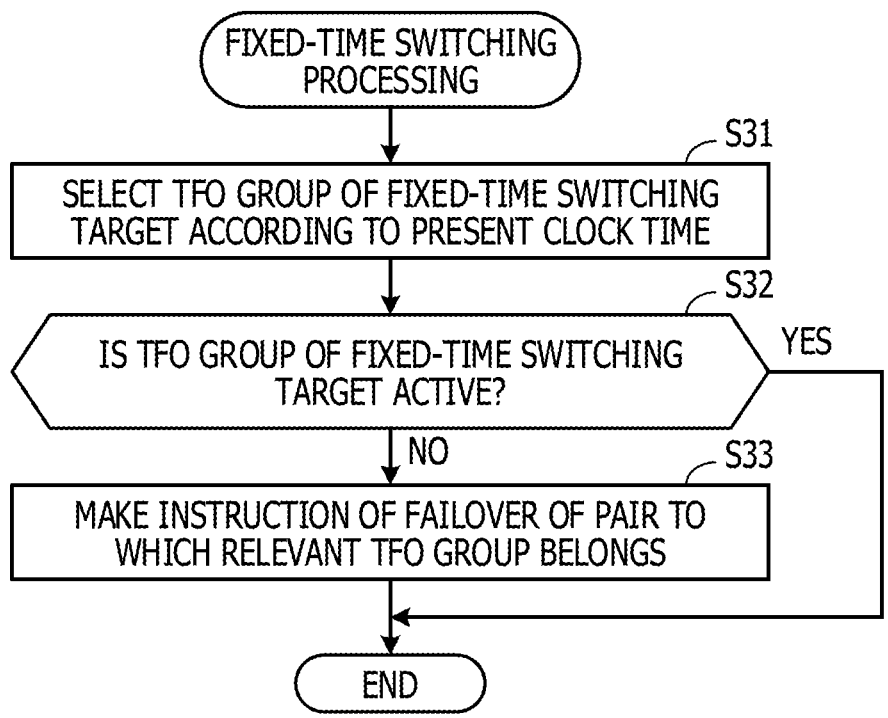
FIG. 16 is a flowchart illustrating an example of fixed-time switching processing.

FIG. 16 is a flowchart illustrating an example of the fixed-time switching processing. The processing represented in FIG. 16 will be described below along the step number. The procedure of FIG. 16 is equivalent to the step S9 in FIG. 13.

(S31) The load balancing control unit 130 refers to the activation schedule table 115 stored in the storing unit 110 and selects a TFO group of the fixed-time switching target according to the present clock time. For example, the load balancing control unit 130 selects a TFO group ID whose switching clock time in the activation schedule table 115 is the present clock time.

(S32) The load balancing control unit 130 refers to the state management table 112 stored in the storing unit 110 and determines whether or not the TFO group of the fixed-time switching target selected in the step S31 is active. If the TFO group is active, the load balancing control unit 130 ends the processing. If the TFO group is not active, the load balancing control unit 130 forwards the processing to a step S33.

(S33) The load balancing control unit 130 instructs the storage apparatuses 200 and 300 to carry out failover of the pair to which the relevant TFO group (TFO group of the fixed-time switching target) belongs. As a result, the TFO group of the fixed-time switching target is switched from standby to active. When the failover is carried out, the load balancing control unit 130 updates the state management table 112 stored in the storing unit 110 regarding the relevant TFO groups.

As above, the storing unit 110 stores information that represents the clock time when the specific TFO group is switched to an active system (activation schedule table 115). Furthermore, if the present clock time reaches the scheduled clock time and the specific TFO group is a standby system, the load balancing control unit 130 extracts the pair to which the specific TFO group belongs as the switching target.

This allows the load balancing control unit 130 to allocate a load to a specific storage apparatus regarding the TFO group of the target. For example, if it is known in advance that the load on a specific TFO group increases depending on the business time, the lowering of the performance of access to data is suppressed and access to data at high speed is enabled by setting the storage apparatus that assumes a role of an active system in advance. For example, in some cases, the kinds of storing devices that configure TFO groups are different (for example, storing devices are SSDs in the storage apparatus 200 whereas storing devices are HDDs in the storage apparatus 300). In such a case, it is possible to carry out control by which a TFO group on the side of the storage apparatus 200 capable of high-speed access to data is made active when the present clock time becomes a fixed clock time. As a result, facilitation of the business of the user may be intended.

Here, the example in which the switching clock time when a TFO group is made active is registered in the activation schedule table 115 is represented. However, the time zone during which the active state is kept may be registered instead of this clock time. Furthermore, the load balancing control unit 130 may carry out control to keep the active state of the relevant TFO group during the registered time zone.

Furthermore, in the example of the second embodiment, mainly the throughput is exemplified as an example of the performance information (index of the load). However, another kind of information such as the response time may be used. For example, in the case of using the response time, it is conceivable that the load balancing control unit 130 employs the average of the response times of the respective TFOVs that belong to the TFO group as the response time of each TFO group. In this case, it is conceivable that the load balancing control unit 130 employs the total sum of the response times of the respective TFO groups that belong to a certain storage apparatus as the performance value of this storage apparatus (however, if the number of TFO groups that belong to the storage apparatus 200 is the same as the number of TFO groups that belong to the storage apparatus 300). Alternatively, the load balancing control unit 130 may employ the average of the response times of the respective TFO groups that belong to a certain storage apparatus as the performance value of this storage apparatus. Regarding the processing other than this processing, the similar procedure to the case of using the throughput may be applied.

Functions of the storing unit 110, the operation information collecting unit 120, and the load balancing control unit 130 possessed by the management server 100 may be possessed by either the CM 210 or 310 (storage control apparatus) instead of the management server 100. For example, it is also possible to cause the RAM 212 and the flash memory 216 of the CM 210 to function as the storing unit 110 and cause the processor 211 of the CM 210 to function as the operation information collecting unit 120 and the load balancing control unit 130. In this case, the CM 210 (storage control apparatus) is one example of the information processing apparatus 1 of the first embodiment.

Furthermore, information processing of the first embodiment may be implemented by causing the processing unit 1b to execute a program. Moreover, information processing of the second embodiment may be implemented by causing the processor 101 (or processor 211) to execute a program. The programs may be recorded on the recording media 13 and 14 that are computer-readable.

For example, the programs may be circulated by distributing the recording media 13 and 14 on which the programs are recorded. Furthermore, the programs may be stored in another computer and the programs may be distributed via a network. For example, the computer may store (install) the program recorded on the recording medium 13 or the program received from another computer in a storing apparatus such as the RAM 102 or the HDD 103 and read the program from this storing apparatus to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus configured to control a first storage apparatus and a second storage apparatus, the first storage apparatus and the second storage apparatus including a plurality of volumes respectively, the first storage apparatus including a first plurality of groups generated by grouping the plurality of volumes and the second storage apparatus including a second plurality of groups generated by grouping the plurality of volumes, a plurality of pairs each of which includes a respective one of the first plurality of groups and a respective one of the second plurality of groups being formed, the information processing apparatus comprising:
a memory; and
a processor coupled to the memory and configured to:
obtain correspondence relationship information that represents a correspondence relationship between the respective one of the first plurality of groups and the respective one of the second plurality of groups in each of the plurality of pairs, and function information that represents whether the respective one of the first plurality of groups and the respective one of the second plurality of groups function as an active system or function as a standby system in each of the plurality of pairs;
identify first performance of each of the plurality of volumes of the first storage apparatus and the plurality of volumes of the second storage apparatus;
identify second performance of each of the first plurality of groups and each of the second plurality of groups based on the first performance; and
based on the second performance, the correspondence relationship information, and the function information, select, from the plurality of pairs, a specific pair in which switching is executed between the active system and the standby system,
the second performance of a first group among the first plurality of groups equals a total of first performance for volumes in the first group and that the second performance of a second group among the second plurality of groups equals a total of first performance for volumes in the second group,
the first storage apparatus includes a first memory having a storage area in which a first group related to the active system among the first plurality of groups is stored and a first processor coupled to the first memory,
the second storage apparatus includes a second memory having a storage area in which a second group related to the standby system among the second plurality of groups is stored and a second processor coupled to the second memory,
the specific pair consists of the first group related to the active system and the second group related to the standby system.

2. The information processing apparatus according to claim 1, wherein the processor is configured to:
identify third performance of the first storage apparatus based on the second performance of the each of the first plurality of groups, and fourth performance of the second storage apparatus based on the second performance of the each of the second plurality of groups; and
select the specific pair based on comparison of the third performance and the fourth performance.

3. The information processing apparatus according to claim 2, wherein the processor is configured to:
identify a first group that functions as the active system from the first plurality of groups, and select a first pair in which the first group is included as the specific pair when the third performance is higher than the fourth performance.

4. The information processing apparatus according to claim 3, wherein the processor is configured to:

select a second group that functions as the active system and has the second performance lower than the second performance of the first group from the second plurality of groups; and select a second pair in which the second group is included as the specific pair.

5. The information processing apparatus according to claim 4, wherein the second performance of the first group is maximum in performance of each of the first plurality of groups.

6. The information processing apparatus according to claim 4, wherein the second performance of the second group is minimum in performance of each of the second plurality of groups.

7. The information processing apparatus according to claim 4, wherein the processor is configured to:

select the specific pair when difference between the third performance and the fourth performance is greater than a first reference value and the third performance or the fourth performance is greater than a second reference value.

8. The information processing apparatus according to claim 4, wherein the processor is configured to:

select a specific volume about which the first performance does not reach a target value from the plurality of volumes; and select the pair in which the specific volume is included as the specific pair based on comparison of the third performance and the fourth performance.

9. The information processing apparatus according to claim 1, wherein the processor is configured to:

obtain information indicating a first clock time when a specific group is switched to the active system; and select the pair in which the specific group is included as the specific pair when a clock time reaches the first clock time and the specific group is the standby system.

10. The information processing apparatus according to claim 1, wherein the processor is configured to:

obtain the second performance of the group that functions as the active system; and not obtain the second performance of the group that functions as the standby system.

11. A method of controlling a first storage apparatus and a second storage apparatus, the first storage apparatus and the second storage apparatus including a plurality of volumes respectively, the first storage apparatus including a first plurality of groups generated by grouping the plurality of volumes and the second storage apparatus including a second plurality of groups generated by grouping the plurality of volumes, a plurality of pairs each of which includes a respective one of the first plurality of groups and a respective one of the second plurality of groups being formed, the method comprising:

obtaining correspondence relationship information that represents a correspondence relationship between the respective one of the first plurality of groups and the respective one of the second plurality of groups in each of the plurality of pairs, and function information that represents whether the respective one of the first plurality of groups and the respective one of the second plurality of groups function as an active system or function as a standby system in each of the plurality of pairs;

identifying first performance of each of the plurality of volumes of the first storage apparatus and the plurality of volumes of the second storage apparatus;

identifying second performance of each of the first plurality of groups and each of the second plurality of groups based on the first performance; and based on the second performance, the correspondence relationship information, and the function information, selecting, from the plurality of pairs, a specific pair in which switching is executed between the active system and the standby system, the second performance of a first group among the first plurality of groups equals a total of first performance for volumes in the first group and that the second performance of a second group among the second plurality of groups equals a total of first performance for volumes in the second group, the first storage apparatus includes a first memory having a storage area in which a first group related to the active system among the first plurality of groups is stored and a first processor coupled to the first memory, the second storage apparatus includes a second memory having a storage area in which a second group related to the standby system among the second plurality of groups is stored and a second processor coupled to the second memory, the specific pair consists of the first group related to the active system and the second group related to the standby system.

12. A non-transitory computer-readable storage medium storing a program that causes an information processing apparatus to execute a process for controlling a first storage apparatus and a second storage apparatus, the first storage apparatus and the second storage apparatus including a plurality of volumes respectively, the first storage apparatus including a first plurality of groups generated by grouping the plurality of volumes and the second storage apparatus including a second plurality of groups generated by grouping the plurality of volumes, a plurality of pairs each of which includes a respective one of the first plurality of groups and a respective one of the second plurality of groups being formed, the process comprising:

obtaining correspondence relationship information that represents a correspondence relationship between the respective one of the first plurality of groups and the respective one of the second plurality of groups in each of the plurality of pairs, and function information that represents whether the respective one of the first plurality of groups and the respective one of the second plurality of groups function as an active system or function as a standby system in each of the plurality of pairs;

identifying first performance of each of the plurality of volumes of the first storage apparatus and the plurality of volumes of the second storage apparatus;

identifying second performance of each of the first plurality of groups and each of the second plurality of groups based on the first performance; and based on the second performance, the correspondence relationship information, and the function information, selecting, from the plurality of pairs, a specific pair in which switching is executed between the active system and the standby system, the second performance of a first group among the first plurality of groups equals a total of first performance for volumes in the first group and that the second performance of a second group among the second plurality of groups equals a total of first performance for volumes in the second group, the first storage apparatus includes a first memory having a storage area in which a first group related to the active system among the first plurality of groups is stored and a first processor coupled to the first memory, the second storage apparatus includes a second memory having a storage area in which a second group related to the standby system among the second plurality of groups is stored and a second processor coupled to the second memory, the specific pair consists of the first group related to the active system and the second group related to the standby system.

\* \* \* \* \*